(12) United States Patent
Li

(10) Patent No.: US 11,258,871 B2
(45) Date of Patent: Feb. 22, 2022

(54) MESSAGE PUSH METHOD AND TERMINAL

(71) Applicant: Huawei Technologies Co., Ltd., Shenzhen (CN)

(72) Inventor: Guoqing Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 627 days.

(21) Appl. No.: 16/301,679

(22) PCT Filed: Feb. 28, 2017

(86) PCT No.: PCT/CN2017/075196
§ 371 (c)(1),
(2) Date: Nov. 14, 2018

(87) PCT Pub. No.: WO2018/086279
PCT Pub. Date: May 17, 2018

(65) Prior Publication Data
US 2019/0289090 A1 Sep. 19, 2019

(30) Foreign Application Priority Data
Nov. 14, 2016 (CN) .......................... 201611000181.3

(51) Int. Cl.
*H04L 29/08* (2006.01)
*H04L 67/55* (2022.01)
(Continued)

(52) U.S. Cl.
CPC .............. *H04L 67/26* (2013.01); *H04L 9/006* (2013.01); *H04L 12/1859* (2013.01); *H04L 29/06* (2013.01)

(58) Field of Classification Search
CPC ..... H04L 67/26; H04L 9/006; H04L 12/1859; H04L 29/06; H04L 51/06
See application file for complete search history.

(56) References Cited

U.S. PATENT DOCUMENTS 10,225,359 B2 * 3/2019 Moore .................... H04L 67/42
2012/0040699 A1 2/2012 Bell et al.
(Continued)

FOREIGN PATENT DOCUMENTS

CN 102333105 A 1/2012
CN 102365841 A 2/2012
(Continued)

OTHER PUBLICATIONS

Ministry of Education Examination Center, "National Computer Rank Examination-Level 4 Exam Guide," First edition, Sep. 1, 2004, 18 pages.
(Continued)

*Primary Examiner* — Paul E Callahan
(74) *Attorney, Agent, or Firm* — Conley Rose, P.C.

(57) ABSTRACT

A message push method, where a first push client determines, based on a security level indication mark, whether the first push client needs to process the push message, and when the first push client does not need to process the push message, forwards the push message to a second push client for processing. In this way, a terminal can perform, based on security level indication marks, differentiated processing on push messages of different security levels such that security processing is performed on sensitive information of a relatively high security level. This avoids information leakage in a process of processing, by the terminal, the sensitive information of the relatively high security level, thereby resolving a push message security processing problem.

20 Claims, 16 Drawing Sheets

(51) Int. Cl.
*H04L 9/00* (2022.01)
*H04L 12/18* (2006.01)
*H04L 9/40* (2022.01)

(56) References Cited

U.S. PATENT DOCUMENTS

| | | |
|---|---|---|
| 2013/0173757 A1 | 7/2013 | Peng et al. |
| 2016/0134426 A1 | 5/2016 | Bell et al. |
| 2016/0241548 A1 | 8/2016 | Kim et al. |
| 2016/0321094 A1 | 11/2016 | Rabi et al. |
| 2017/0374040 A1 | 12/2017 | Hua et al. |

FOREIGN PATENT DOCUMENTS

| | | | |
|---|---|---|---|
| CN | 103229523 | A | 7/2013 |
| CN | 105260663 | A | 1/2016 |
| CN | 105279398 | A | 1/2016 |
| CN | 105282149 | A | 1/2016 |
| CN | 105335673 | A | 2/2016 |
| CN | 105446713 | A | 3/2016 |
| CN | 105516104 | A | 4/2016 |
| CN | 105590061 | A | 5/2016 |
| CN | 105592071 | A | 5/2016 |
| CN | 105975867 | A | 9/2016 |
| CN | 105991287 | A | 10/2016 |
| CN | 105991569 | A | 10/2016 |
| CN | 105450406 | B | 10/2018 |

OTHER PUBLICATIONS

Foreign Communication From A Counterpad Application, European Application No. 17868863.6, Extended European Search Report dated Apr. 26, 2019, 5 pages.
Machine Translation and Abstract of Chinese Publication No. CN105590061, May 18, 2016, 9 pages.
Machine Translation and Abstract of Chinese Publication No. CN105592071, May 18, 2016, 11 pages.
Machine Translation and Abstract of Chinese Publication No. CN105991287, Oct. 5, 2016, 20 pages.
Foreign Communication From A Counterpart Application, PCT Application No. PCT/CN2017/075196, English Translation of International Search Report dated Aug. 16, 2017, 2 pages.
Machine Translation and Abstract of Chinese Publication No. CN102333105, Jan. 25, 2012, 30 pages.
Machine Translation and Abstract of Chinese Publication No. CN105279398, Jan. 27, 2016, 14 pages.
Machine Translation and Abstract of Chinese Publication No. CN105282149, Jan. 27, 2016, 15 pages.
Machine Translation and Abstract of Chinese Publication No. CN105335673, Feb. 17, 2016, 14 pages.
Machine Translation and Abstract of Chinese Publication No. CN105446713, Mar. 30, 2016, 23 pages.
Machine Translation and Abstract of Chinese Publication No. CN105975867, Sep. 28, 2016, 9 pages.
Foreign Communication From A Counterpart Application, Chinese Application No. 201780009070.5, Chinese Office Action dated Dec. 25, 2019, 9 pages.

* cited by examiner

BofA/Merrill/U.S.T. Visa Credit

Card number                Visa ···· 7855

Digital card number       Visa ···· 2326

FIG. 1

BofA/Merrill/U.S.T. Visa Credit..     4:09 PM
BEST BUY 0685 $ 1.99

FIG. 2

MESSAGE PUSH METHOD AND TERMINAL

CROSS-REFERENCE TO RELATED APPLICATIONS

This application is a U.S. National Stage of International Patent Application No. PCT/CN2017/075196 filed on Feb. 28, 2017, which claims priority of Chinese Patent Application No. 201611000181.3 filed on Nov. 14, 2016. Both of the aforementioned applications are hereby incorporated by reference in their entireties.

TECHNICAL FIELD

This application relates to the field of electronic technologies, and in particular, to a message push method and a terminal.

BACKGROUND

Push refers to a manner of communications connection and message sending between a server and a client. By using a push service, the server can proactively send message content such as a picture or text to a computer or a mobile terminal, and the computer or the mobile terminal does not need to proactively query the server. Currently, with development of push services, content pushed to a terminal by using a push service not only includes non-sensitive information such as an advertisement and application update information, but also includes sensitive information such as a transaction receipt, a verification code, and system configuration information. For example, FIG. 1 and FIG. 2 show transaction information currently pushed by a vendor to a user terminal by using a push message. To ensure user information security, some transmission encryption mechanisms are added to an existing push transmission process, so as to reduce a risk of push data leakage during transmission. A prior-art problem is that, although push message transmission security is ensured, a push message may still be obtained and utilized by a malicious program in a terminal after the push message reaches the terminal, and as a result, personal information of a user is leaked. Therefore, an existing push service can only ensure push message transmission security, and there is a security processing problem after a push message is sent to a terminal.

SUMMARY

A technical problem to be resolved in embodiments of the present invention is to provide a message push method and a terminal, so as to resolve a push message security processing problem, thereby reducing a risk of push data leakage.

A first aspect of this application provides a message push method, including: receiving, by a first push client, a push message sent by a push server, where the push message includes a security level indication mark and push data; determining, by the first push client based on the security level indication mark, whether the first push client needs to process the push message; and if the first push client does not need to process the push message, forwarding, by the first push client, the push data to a second push client, so that the second push client processes the push data, where the first push client is a push client in a first running environment of a terminal, and the second push client is a push client in a second running environment of the terminal.

In this technical solution, the first push client determines, based on the security level indication mark, whether the first push client needs to process the push message, and when the first push client does not need to process the push message, forward the push data to the second push client for processing. In this way, the terminal can perform, based on security level indication marks, differentiated processing on push messages of different security levels, so that security processing is performed on sensitive information of a relatively high security level. This avoids information leakage in a process of processing, by the terminal, the sensitive information of the relatively high security level, thereby resolving a push message security processing problem.

In a first possible implementation of the first aspect, the security level indication mark includes a first security level mark or a second security level mark, the first security level mark is used to indicate that the push data is encrypted by using an REE session key, and the second security level mark is used to indicate that the push data is encrypted by using a Trusted Execution Environment TEE session key.

In this technical solution, the push server encrypts the push data based on the security level indication mark, so that only a push client with processing permission for a corresponding security level can decrypt and process the push data. This avoids information leakage in a process of processing, by the terminal, sensitive information of a relatively high security level, thereby resolving a push message security processing problem.

With reference to the first possible implementation of the first aspect, in a second possible implementation of the first aspect, the first running environment is an REE, the first push client is a push client in the REE of the terminal, the second running environment is a TEE, and the second push client is a push client in the TEE of the terminal; and if the security level indication mark is the first security level mark, the first push client needs to process the push message; or if the security level indication mark is the second security level mark, the first push client does not need to process the push message.

In this technical solution, a push message whose security level indication mark is the first security level mark is processed by the push client in the REE, and a push message whose security level indication mark is the second security level mark is processed by the push client in the TEE. In other words, a push message of a relatively high security level is processed by the push client in the TEE. This avoids information leakage in a process of processing, by the terminal, sensitive information of a relatively high security level, thereby resolving a push message security processing problem.

With reference to the second possible implementation of the first aspect, in a third possible implementation of the first aspect, the first push client forwards the push data to the second push client, so that the second push client decrypts the push data by using the TEE session key.

With reference to the second or the third possible implementation of the first aspect, in a fourth possible implementation of the first aspect, the TEE session key is determined by the second push client and the push server through negotiation based on a random number generated by the second push client and a random number generated by the push server.

With reference to the first possible implementation of the first aspect, in a fifth possible implementation of the first aspect, the first running environment is a TEE, the first push client is a push client in the TEE of the terminal, the second running environment is an REE, and the second push client is a push client in the REE of the terminal; and if the security level indication mark is the first security level mark, the first push client does not need to process the push message; or if the security level indication mark is the second security level mark, the first push client needs to process the push message.

In this technical solution, a push message whose security level indication mark is the first security level mark is processed by the push client in the REE, and a push message whose security level indication mark is the second security level mark is processed by the push client in the TEE. In other words, a push message of a relatively high security level is processed by the push client in the TEE. This avoids information leakage in a process of processing, by the terminal, sensitive information of a relatively high security level, thereby resolving a push message security processing problem.

With reference to the fifth possible implementation of the first aspect, in a sixth possible implementation of the first aspect, the first push client forwards the push data to the second push client, so that the second push client decrypts the push data by using the REE session key.

With reference to the fifth or the sixth possible implementation of the first aspect, in a seventh possible implementation of the first aspect, the REE session key is sent to the second push client after being determined by the first push client and the push server through negotiation based on a random number generated by the first push client and a random number generated by the push server.

With reference to any one of the fifth to the seventh possible implementations of the first aspect, in an eighth possible implementation of the first aspect, if the first push client determines that the first push client needs to process the push message, the first push client decrypts the push data by using the TEE session key, and calls a trusted user interface TUI to display the decrypted push data, or saves the decrypted push data to trusted storage space.

In a ninth possible implementation of the first aspect, the push message is generated after being encrypted by using a TEE session key.

With reference to the ninth possible implementation of the first aspect, in a tenth possible implementation of the first aspect, the first running environment is a TEE, the first push client is a push client in the TEE of the terminal, the second running environment is an REE, and the second push client is a push client in the REE of the terminal; the first push client decrypts the push message by using the preset TEE session key, to obtain the push data; and the first push client forwards the push data to the second push client.

In this technical solution, the push server encrypts push messages of different security levels by using the TEE session key, and only a push client in the TEE can decrypt such an encrypted push message. After the push message is decrypted, push data is sent, based on a security level of the push data, to a corresponding push client for processing. This avoids information leakage in a process of processing, by the terminal in the REE, sensitive information of a relatively high security level, thereby resolving a push message security processing problem.

With reference to the tenth possible implementation of the first aspect, in an eleventh possible implementation of the first aspect, the TEE session key is determined by the first push client and the push server through negotiation based on a random number generated by the first push client and a random number generated by the push server.

With reference to the ninth possible implementation of the first aspect, in a twelfth possible implementation of the first aspect, the first running environment is an REE, the first push client is a push client in the REE of the terminal, the second running environment is a TEE, and the second push client is a push client in the TEE of the terminal; and if the first push client is incapable of obtaining the security level indication mark from the push message through decryption, the first push client does not need to process the push message.

In this technical solution, the push server encrypts push messages of different security levels by using the TEE session key, and only a push client in the TEE can decrypt such an encrypted push message. After the push message is decrypted, push data is sent, based on a security level of the push data, to a corresponding push client for processing. This avoids information leakage in a process of processing, by the terminal in the REE, sensitive information of a relatively high security level, thereby resolving a push message security processing problem.

With reference to the twelfth possible implementation of the first aspect, in a thirteenth possible implementation of the first aspect, the first push client forwards the push message to the second push client, so that the second push client decrypts the push message by using the TEE session key.

With reference to the second possible implementation of the first aspect, in a fourteenth possible implementation of the first aspect, the push data includes a device wakeup indication, and the first push client forwards the device wakeup indication to the second push client, so that the second push client decrypts the device wakeup indication by using the TEE session key, and establishes, based on the device wakeup indication, a connection to a second device corresponding to the device wakeup indication.

In this technical solution, the terminal processes, by using the push client in the TEE, the device wakeup indication as push data of a relatively high level, so that the push client in the TEE can establish, based on the device wakeup indication, the connection to the second device associated with the terminal. This ensures that the push server sends the push data to the second device by using the push client in the TEE, and avoids information leakage in a process of processing, by the terminal, the related push data for the second device, thereby resolving a push message security processing problem.

With reference to any one of the fifth to the seventh possible implementations of the first aspect, in a fifteenth possible implementation of the first aspect, the push data includes a device wakeup indication, and if the first push client needs to process the push message, the first push client decrypts the device wakeup indication by using the TEE session key, and establishes, based on the device wakeup indication, a connection to a second device corresponding to the device wakeup indication.

With reference to any one of the first aspect, or the first to the fifteenth possible implementations of the first aspect, in a sixteenth possible implementation of the first aspect, the push message further includes a push object identifier, and the first push client forwards the push data and the push object identifier to the second push client, so that the second push client sends the push data to a target application program indicated by the push object identifier.

With reference to the sixteenth possible implementation of the first aspect, in a seventeenth possible implementation of the first aspect, the second push client sends the push data to the target application program that is indicated by the push object identifier and that is on the second device associated with the terminal.

A second aspect of this application provides a message push method, including: receiving, by a first push client, a push message sent by a push server, where the push message includes a security level indication mark and push data; determining, by the first push client based on the security level indication mark, whether the first push client needs to process the push message; if the first push client does not need to process the push message, forwarding, by the first push client, the push data to a second push client; and processing, by the second push client, the push data, where the first push client is a push client in a first running environment of a terminal, and the second push client is a push client in a second running environment of the terminal.

In this technical solution, the first push client determines, based on the security level indication mark, whether the first push client needs to process the push message, and when the first push client does not need to process the push message, forwards the push data to the second push client for processing. In this way, the terminal can perform, based on security level indication marks, differentiated processing on push messages of different security levels, so that security processing is performed on sensitive information of a relatively high security level. This avoids information leakage in a process of processing, by the terminal, the sensitive information of the relatively high security level, thereby resolving a push message security processing problem.

A third aspect of this application provides a terminal. The terminal includes a first push client and a second push client, the first push client includes a first transceiver module and a first processing module, and the second push client includes a second transceiver module and a second processing module. The terminal implements some or all of the methods in the first aspect and the second aspect by using the foregoing modules.

A fourth aspect of this application provides another terminal. The terminal includes a processor, a memory, and a network interface. The processor is connected to the memory and the network interface. For example, the processor may be connected to the memory and the network interface by using a bus. The network interface is configured to receive the message in the foregoing method from and send the message in the foregoing method to a push server. The memory is configured to store a push message. The processor is configured to perform some or all of the processes in the first aspect and the second aspect.

BRIEF DESCRIPTION OF DRAWINGS

FIG. 1 is an example diagram of transaction information push according to an existing technical solution;

FIG. 2 is another example diagram of transaction information push according to an existing technical solution;

DESCRIPTION OF EMBODIMENTS

The following describes the technical solutions in the embodiments of this application with reference to the accompanying drawings in the embodiments of this application.

Figure 3:
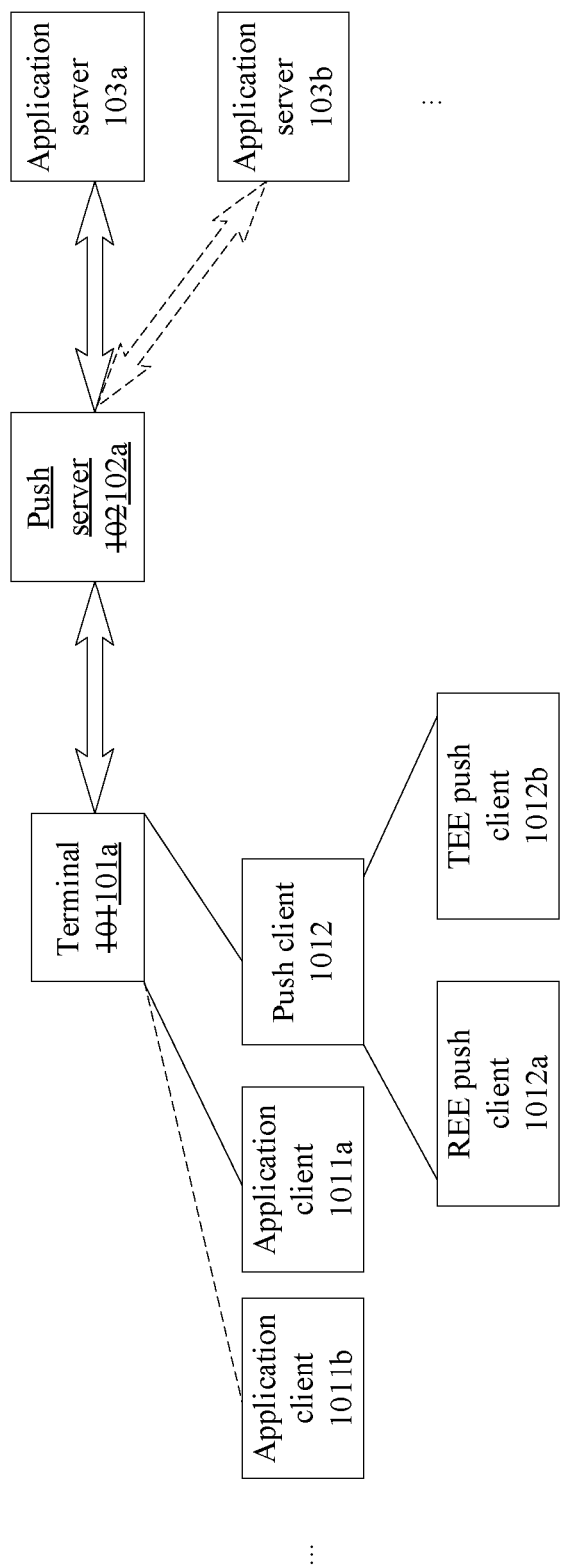
FIG. 3 is a schematic diagram of a push service architecture according to an embodiment of this application.

The technical solutions in the embodiments of this application are applicable to various push-service-based system architectures. For example, in a schematic diagram of a push service architecture shown in FIG. 3, a terminal 101a, a push server 102a, and at least one application server 103 (FIG. 3 shows an application server 103a and an application server 103b) are included. An interior of the terminal 101 includes at least one application client 1011 (FIG. 3 shows a client 1011a and a client 1011b) and a push client 1012. The application client 1011 and the application server 103 are corresponding to each other. To be specific, both the application client 1011 and the application server 103 are for a same application program. In specific implementation, the push client 1012 includes two entities: a push client 1012a that runs in a rich execution environment (REE, Rich Execution Environment) of the terminal and a push client 1012b that runs in a Trusted Execution Environment (TEE, Trusted Execution Environment) of the terminal. The push client 1012a in the rich execution environment and the push client 1012b in the Trusted Execution Environment are connected by using a secure channel. For example, a possible implementation of the secure channel is: The push client in the TEE provides a client API (standard TEE Client API) interface for the push client in the REE, and the push client in the REE communicates with the push client in the TEE by calling the client API.

Herein, the rich execution environment REE is, in general, a running environment without a particular security function. The Trusted Execution Environment TEE is a running environment that coexists with the rich execution environment REE in the terminal, and can provide, for a trusted application, a secure running environment free from software attacks. The TEE has a CPU core isolated from the REE. The CPU core of the TEE may be a core that is physically isolated from the REE or virtually isolated from the REE. The TEE has storage space that is invisible to the REE and that is implemented by using a secure-storage technology. Therefore, the TEE can ensure that assets (for example, a key, data, and software) in the storage space of the TEE are free from software attacks and resist a particular type of security threat.

The following describes in detail message push methods and related processes in execution of the methods, by using embodiments shown in FIG. 4a to FIG. 7b.

Figure 4A:
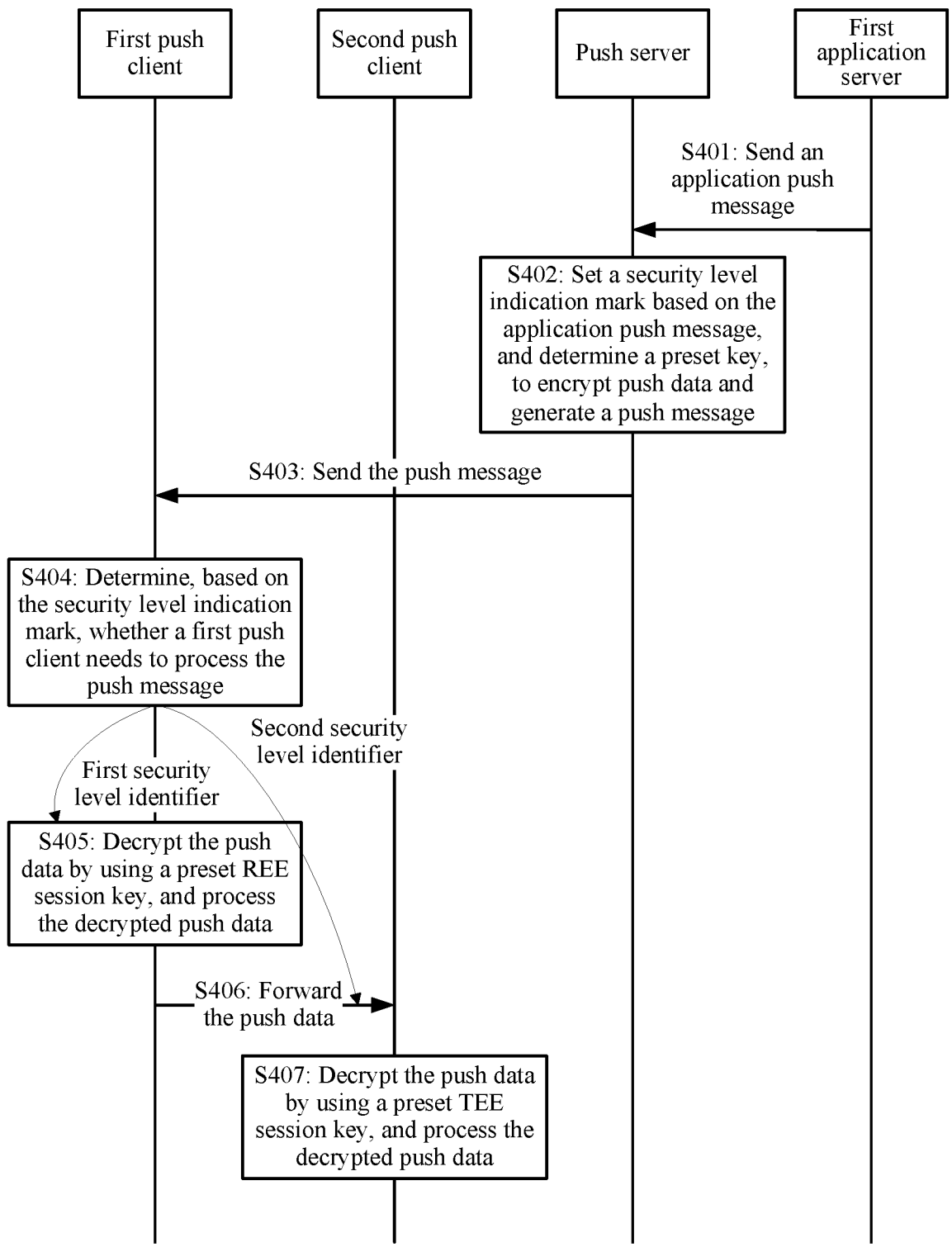
FIG. 4a is a schematic flowchart of a message push method according to an embodiment of this application.
Figure 4B:
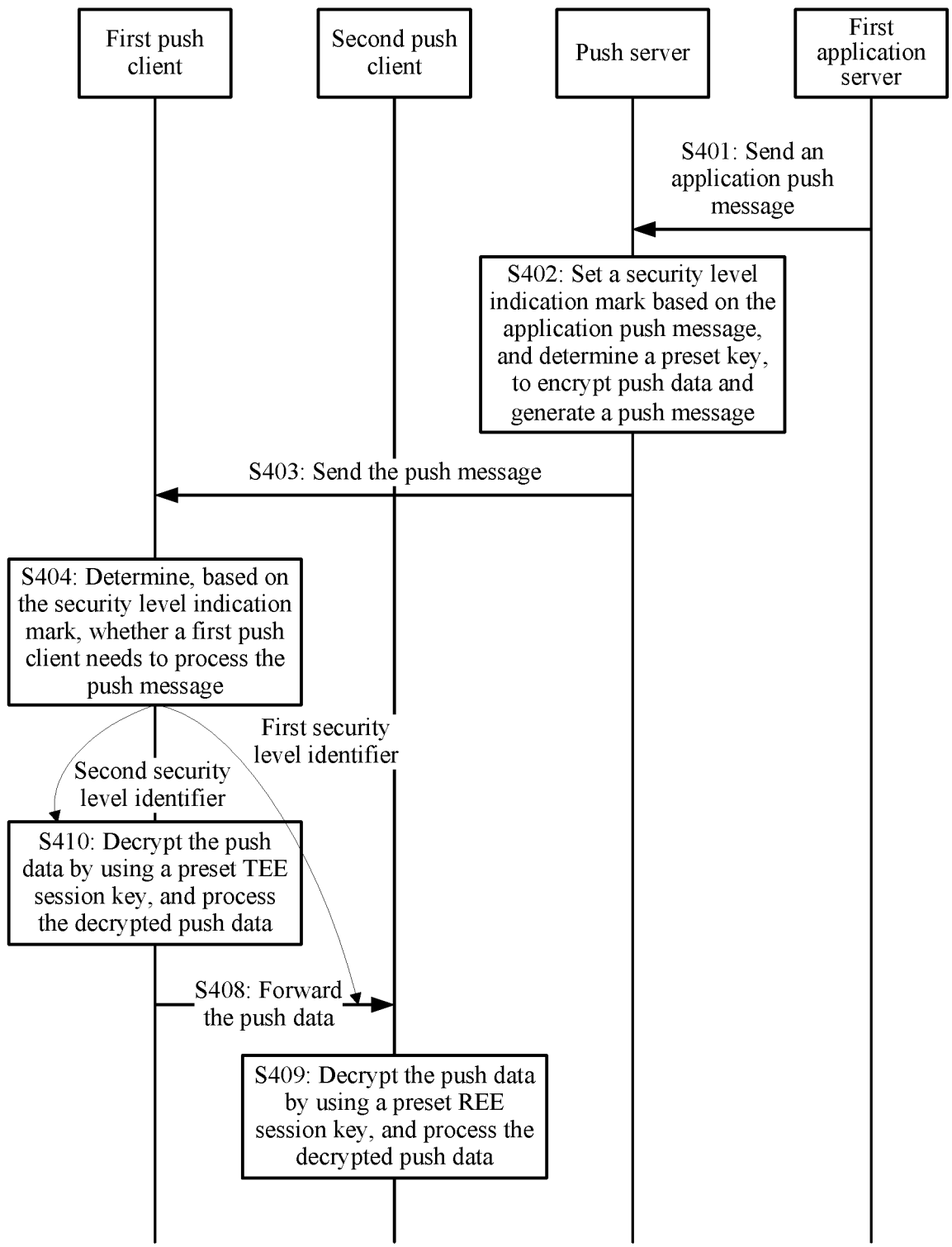
FIG. 4b is a schematic flowchart of another message push method according to an embodiment of this application.

FIG. 4a and FIG. 4b are schematic flowcharts of two message push methods according to embodiments of this application. In an embodiment shown in FIG. 4a, a first push client is a push client in an REE of a terminal, and a second push client is a push client in a TEE of the terminal. In an embodiment shown in FIG. 4b, a first push client is a push client in a TEE of a terminal, and a second push client is a push client in an REE of the terminal. A specific method includes the following steps.

Step S401: A first application server sends an application push message to a push server, where the application push message carries push data and a push object identifier.

The application push message carries the push data and the push object identifier. In other words, the first application server expects to send the push data to a first application on the terminal corresponding to the push object identifier. It should be noted that the push object identifier herein may be a terminal application identifier stored in a push service list of the first application server. In other words, the push object identifier is the terminal application identifier in the push service list of the first application server.

Step S402: The push server sets a security level indication mark based on the application push message, and determines a preset key, to encrypt the push data and generate a push message.

The push server may set, based on the application push message, the security level indication mark for the push message corresponding to the application push message, and determine the key corresponding to the specified security level mark, so as to encrypt the push data and finally generate the push message that carries the security level indication mark and the push data. In the embodiments shown in FIG. 4a and FIG. 4b, the security level indication mark may include a first security level mark and a second security level mark. The first security level mark indicates push data of a relatively low security level or a common security level, and the terminal does not need to perform security processing on such push data after receiving the push data. The second security level mark indicates push data of a relatively high security level or a special security level, and the terminal needs to perform security processing on such push data by using the TEE.

During setting of the security level indication mark, in a possible implementation scenario, the application push message sent by the first application server may carry a security processing indication label, to instruct the push server to set the security level indication mark of the push message to the second security level mark; if the application push message sent by the first application server carries no security processing indication label, the push server may set the security level indication mark of the push message to the first security level mark. In another possible implementation scenario, the push server may analyze the application push message sent by the first application server, and determine the security level indication mark of the push message based on a message feature indicator, such as content, a data type, a priority, or an emergency type, of the application push message.

It should be noted that the security level indication mark herein may be added to a message header of the push message, to be specific, occupy a fixed-length byte in the message header of the push message. Further, the push server may further encrypt the security level indication mark by using a key corresponding to a key held by a push client that receives the push message, or may not encrypt the security level indication mark. This is not specifically limited herein. Specifically, if the client receiving the push message is a push client in the REE, the security level indication mark may be encrypted by using an REE session key that is generated in advance through negotiation. If the client receiving the push message is a push client in the TEE, the security level indication mark may be encrypted by using a TEE session key that is generated in advance through negotiation.

In the embodiments shown in FIG. 4a and FIG. 4b, the push data included in the push message is encrypted, and there is a correspondence between an encryption key and the security level indication mark. Specifically, when the push server sets the security level indication mark to the first security level mark, the push data included in the push message is generated after being encrypted by using the REE session key; when the push server sets the security level indication mark to the second security level mark, the push data included in the push message is generated after being encrypted by using the TEE session key.

Step S403: The push server sends the push message to the first push client.

The push server may determine, based on the push object identifier, the terminal corresponding to the push object identifier, and send the push message to the first push client in the terminal.

In an implementation scenario shown in FIG. 4a, the first push client is the push client in the REE environment of the terminal, and the second push client is the push client in the TEE of the terminal. In the implementation scenario, the first push client may access a network communications interface to receive the push message sent by the push server, and the second push client cannot directly access the network communications interface and needs to receive the push message by using the first push client.

In an implementation scenario shown in FIG. 4b, the first push client is the push client in the TEE of the terminal. In the implementation scenario, the first push client has a capability of accessing a network communications interface, and can directly communicate with the push server.

Step S404: The first push client determines, based on the security level indication mark, whether the first push client needs to process the push message.

In the implementation scenario shown in FIG. 4a, if the received security level indication mark is encrypted, the first push client may first decrypt the encrypted security level indication mark by using the REE session key, and then determine, based on the security level indication mark, whether the first push client should process the received push message. In the implementation scenario shown in FIG. 4b, if the received security level indication mark is encrypted, the first push client may first decrypt the encrypted security level indication mark by using the TEE session key, and then determine, based on the security level indication mark, whether the first push client should process the received push message.

In the implementation scenario shown in FIG. 4a, step S404 may include step S4041.

Step S4041: If the security level indication mark is the first security level mark, the first push client needs to process the push message and performs step S405; or if the security level indication mark is the second security level mark, the first push client does not need to process the push message, and steps S406 and S407 are performed.

When the security level indication mark is the first security level mark, it indicates that the push message has a relatively low security level, and may be processed in the REE. Therefore, the first push client may directly process the push message. When the security level indication mark is the second security level mark, it indicates that the push message has a relatively high security level, and needs to be processed in the TEE. Therefore, the first push client does not need to process the push message.

In the implementation scenario shown in FIG. 4b, step S404 may include step S4042.

Step S4042: If the security level indication mark is the first security level mark, the first push client does not need to process the push message, and steps S408 and S409 are performed; or if the security level indication mark is the second security level mark, the first push client needs to process the push message and performs step S410.

When the security level indication mark is the first security level mark, it indicates that the push message has a relatively low security level, and may be processed in the REE. Therefore, the first push client does not need to process the push message. When the security level indication mark is the second security level mark, it indicates that the push message has a relatively high security level, and needs to be processed in the TEE. Therefore, the first push client needs to process the push message.

Step S405: The first push client decrypts the push data by using the preset REE session key, and processes the decrypted push data.

The push server encrypts the push data with the first security level mark by using the REE session key. Therefore, the first push client only needs to decrypt the push data by using the REE session key that is received from the second push client in advance in a key negotiation phase.

In a possible implementation scenario, after obtaining the decrypted push data, the first push client may instruct an operating system of the terminal to process the decrypted push data. In another possible implementation scenario, the push message sent by the push server to the first push client may further include the push object identifier. In this way, the first push client can send the decrypted push data to a target application program indicated by the push object identifier or an REE application part corresponding to a target application program, so that the target application program or the REE application part corresponding to the target application program processes the decrypted push data. Herein, the target application program may be a first application program served by the first application server.

Step S406: The first push client forwards the push data to the second push client.

The first push client does not need to process the push message, and therefore forwards the push data to the second push client for processing. It should be noted that, in this case, the first push client may send only the push data to the second push client, or may send the entire push message to the second push client. This is not specifically limited herein.

Step S407: The second push client decrypts the push data by using the preset TEE session key, and processes the decrypted push data.

The push server encrypts the push data with the second security level mark by using the TEE session key. Therefore, the second push client only needs to decrypt the push data by using the TEE session key that is generated in a key negotiation phase.

In a possible implementation scenario, the second push client may instruct the TEE to call a trusted user interface (TUI, Trusted User Interface) to display the decrypted push data, or save the decrypted push data to trusted storage space. In another possible implementation scenario, the push message sent by the push server to the first push client may further include the push object identifier, and the push data sent by the first push client to the second push client also carries the push object identifier. In this way, the second push client can send the decrypted push data to a TEE application part corresponding to a target application program indicated by the push object identifier, so that the TEE application part corresponding to the target application program processes the decrypted push data. Herein, the target application program may be a first application program served by the first application server.

Step S408: The first push client forwards the push data to the second push client.

The first push client does not need to process the push message, and therefore forwards the encrypted push data to the second push client for processing. It should be noted that, in this case, the first push client may send only the push data to the second push client, or may send the entire push message to the second push client. This is not specifically limited herein.

Step S409: The second push client decrypts the push data by using the preset REE session key, and processes the decrypted push data.

The push server encrypts the push data with the first security level mark by using the REE session key. Therefore, the second push client only needs to decrypt the push data by using the REE session key that is received from the first push client in advance in a key negotiation phase.

In a possible implementation scenario, after obtaining the decrypted push data, the second push client may instruct an operating system of the terminal to process the decrypted push data. In another possible implementation scenario, the push message sent by the push server to the first push client may further include the push object identifier, and the push data sent by the first push client to the second push client also carries the push object identifier. In this way, the first push client can send the decrypted push data to a target application program indicated by the push object identifier or an REE application part corresponding to a target application program, so that the target application program or the REE application part corresponding to the target application program processes the decrypted push data. Herein, the target application program may be a first application program served by the first application server.

Step S410: The first push client decrypts the push data by using the preset TEE session key, and processes the decrypted push data.

The push server encrypts the push data with the second security level mark by using the TEE session key. Therefore, the first push client only needs to decrypt the push data by using the TEE session key that is generated in a key negotiation phase.

In a possible implementation scenario, the first push client may instruct the TEE to call a trusted user interface (TUI, Trusted User Interface) to display the decrypted push data, or save the decrypted push data to trusted storage space. In another possible implementation scenario, the push message sent by the push server to the first push client may further include the push object identifier. In this way, the first push client can send the decrypted push data to a TEE application part corresponding to a target application program indicated by the push object identifier, so that the TEE application part corresponding to the target application program processes the decrypted push data. Herein, the target application program may be a first application program served by the first application server.

According to the embodiments shown in FIG. 4a and FIG. 4b, push data of different security levels is encrypted by using different session keys, and push data is sent, based on a security level of the push data, to a corresponding push client for processing. This avoids information leakage in a process of processing, by the terminal, sensitive information of a relatively high security level, thereby resolving a push message security processing problem.

Figure 5A:
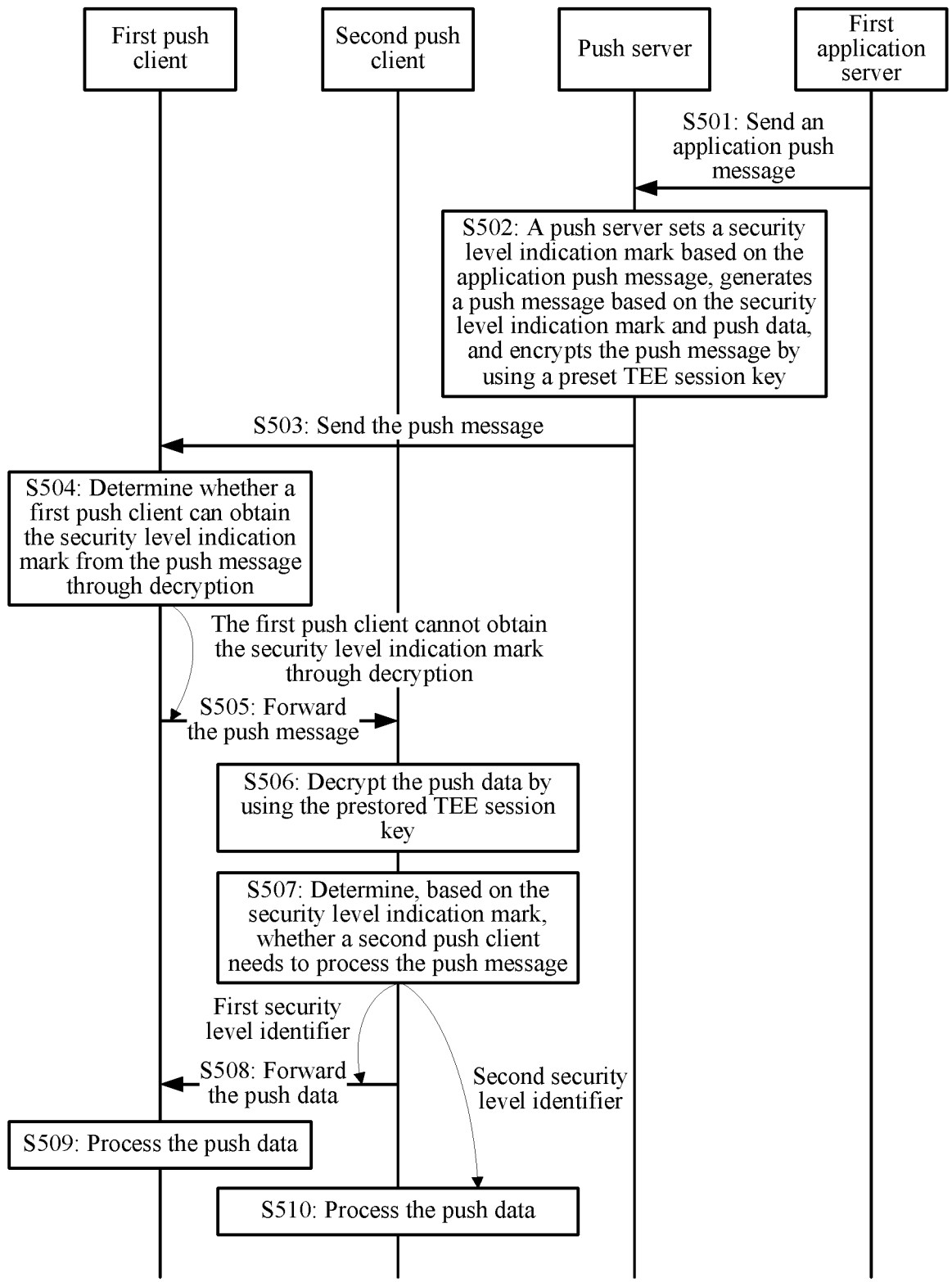
FIG. 5a is a schematic flowchart of another message push method according to an embodiment of this application.
Figure 5B:
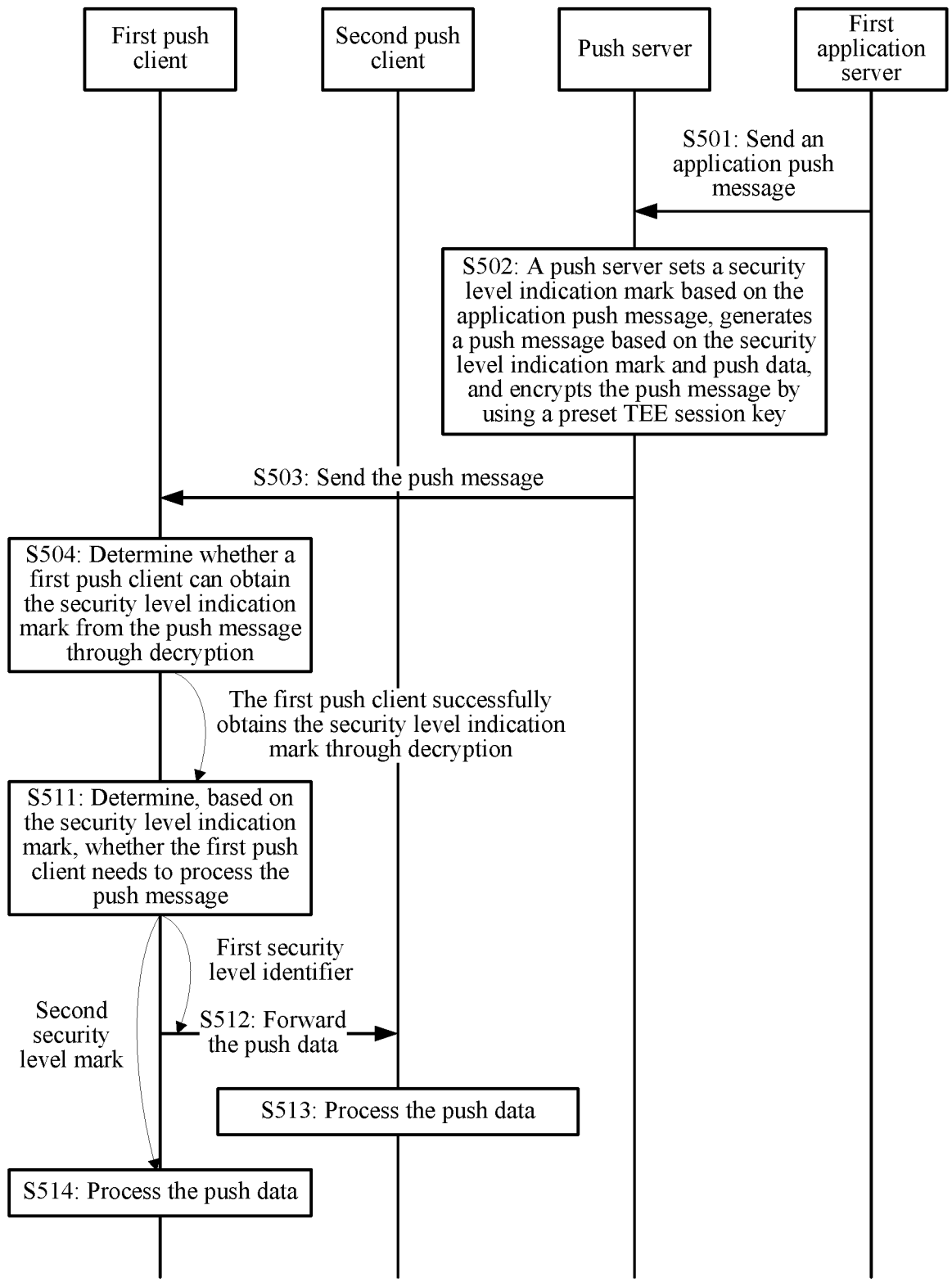
FIG. 5b is a schematic flowchart of another message push method according to an embodiment of this application.

FIG. 5a and FIG. 5b are schematic flowcharts of two message push methods according to embodiments of this application. In an embodiment shown in FIG. 5a, a first push client is a push client in an REE of a terminal, and a second push client is a push client in a TEE of the terminal. In an embodiment shown in FIG. 5b, a first push client is a push client in a TEE of a terminal, and a second push client is a push client in an REE of the terminal. A specific method includes the following steps.

Step S501: A first application server sends an application push message to a push client, where the application push message carries push data and a push object identifier.

Step S502: The push server sets a security level indication mark based on the application push message, generates a push message based on the security level indication mark and the push data, and encrypts the push message by using a preset TEE session key.

The push server may set, based on the application push message, the security level indication mark for the push message corresponding to the application push message, and finally generate the push message that carries the security level indication mark and the push data. In the embodiments shown in FIG. 5a and FIG. 5b, the security level indication mark may include a first security level mark and a second security level mark. The first security level mark indicates push data of a relatively low security level or a common security level. The second security level mark indicates push data of a relatively high security level or a special security level.

In the embodiments shown in FIG. 5a and FIG. 5b, after generating the push message, the push server may encrypt the push message by using the TEE session key that is generated in advance through negotiation. In this case, the push message sent by the push server is encrypted as a whole, and the push message includes the push data and the security level indication mark. In the embodiments shown in FIG. 5a and FIG. 5b, the push data is unencrypted push data.

During setting of the security level indication mark, in a possible implementation scenario, the application push message sent by the first application server may carry a security processing indication label, to instruct the push server to set the security level indication mark of the push message to the second security level mark; if the application push message sent by the first application server carries no security processing indication label, the push server may set the security level indication mark of the push message to the first security level mark. In another possible implementation scenario, the push server may analyze the application push message sent by the first application server, and determine the security level indication mark of the push message based on a message feature indicator, such as content, a data type, a priority, or an emergency type, of the application push message.

It should be noted that the security level indication mark herein may be added to a message header of the push message, to be specific, occupy a fixed-length byte in the message header of the push message.

Step S503: The push server sends the push message to the first push client.

The push server may determine, based on the push object identifier, the terminal corresponding to the push object identifier, and send the push message to the first push client in the terminal.

In an implementation scenario shown in FIG. 5a, the first push client is the push client in the REE of the terminal, and the second push client is the push client in the TEE of the terminal. In the implementation scenario, the first push client may access a network communications interface to receive the push message sent by the push server, and the second push client cannot access the network communications interface and needs to receive the push message by using the first push client.

In an implementation scenario shown in FIG. 5b, the first push client is the push client in the TEE of the terminal. In the implementation scenario, the first push client has a capability of accessing a network communications interface, and can directly communicate with the push server.

Step S504: The first push client determines whether the first push client can obtain the security level indication mark from the push message through decryption.

In the implementation scenario shown in FIG. 5a, step S504 may include step S5041.

Step S5041: When the first push client cannot obtain the security level indication mark from the push message through decryption, the first push client does not need to process the push message, and steps S505 to S510 are performed.

When receiving the push message, the first push client needs to parse the push message to obtain the security level indication mark. When the first push client cannot obtain the security level indication mark in the push message through parsing, the first push client does not need to process the push message. In specific implementation, in a possible implementation scenario, the first push client stores no related key, and can directly determine, when receiving the push message, that the first push client cannot obtain the security level indication mark from the push message through decryption. In this case, the first push client does not need to process the push message, and steps S505 to S510 are performed. In another possible implementation scenario, the first push client possibly stores another key, and can perform decryption on the push message when receiving the push message. The push message sent by the push server is encrypted by using the TEE session key, but the first push client has no TEE session key, and cannot decrypt the push data. Therefore, the first push client cannot obtain the security level indication mark from the push message. In this case, the first push client does not need to process the push message, and steps S505 to S510 are performed.

In the implementation scenario shown in FIG. 5b, step S504 may include step S5042.

Step S5042: Perform steps S511 to S514 when the first push client successfully obtains the security level indication mark from the push message through decryption.

The push message sent by the push server is encrypted by using the TEE session key, and the first push client has the TEE session key. Therefore, the first push client can obtain the security level indication mark and the push data by decrypting the push message. In this case, steps S511 to S514 are performed.

Step S505: The first push client forwards the push message to the second push client.

The first push client does not need to process the push message, and therefore forwards the push message to the second push client.

Step S506: The second push client decrypts the push message by using the preset TEE session key.

The push message sent by the push server is encrypted by using the TEE session key. Therefore, the second push client can obtain the push data in the push message by decrypting the push message by using the TEE session key that is generated in a key negotiation phase.

Step S507: The second push client determines, based on the security level indication mark, whether the second push client needs to process the push message; and if the security level indication mark is the first security level mark, the second push client does not need to process the push message, and steps S508 and S509 are performed; or if the security level indication mark is the second security level mark, the second push client needs to process the push message and performs step S510.

Step S508: The second push client forwards the push data to the first push client.

Step S509: The first push client processes the push data.

In a possible implementation scenario, after obtaining the push data, the first push client may instruct an operating system of the terminal to process the push data. In another possible implementation scenario, the push message sent by the push server to the first push client may further include the push object identifier. In this way, the first push client can send the push data to a target application program indicated by the push object identifier or an REE application part corresponding to a target application program, so that the target application program or the REE application part corresponding to the target application program processes the decrypted push data.

Step S510: The second push client processes the push data.

In a possible implementation scenario, the second push client may instruct the TEE to call a trusted user interface (TUI, Trusted User Interface) to display the push data, or save the push data to trusted storage space. In another possible implementation scenario, the push message sent by the push server to the first push client may further include the push object identifier, and the push message forwarded by the first push client to the second push client also carries the push object identifier. In this way, the second push client can send the push data to a TEE application part corresponding to a target application program indicated by the push object identifier, so that the TEE application part corresponding to the target application program processes the push data.

Step S511: The first push client determines, based on the security level indication mark, whether the first push client needs to process the push message; and if the security level indication mark is the first security level mark, the first push client does not need to process the push message, and steps S512 and S513 are performed; or if the security level indication mark is the second security level mark, the first push client needs to process the push message, and the first push client processes the push message and performs step S514.

Step S512: The first push client forwards the push data to the second push client.

Step S513: The second push client processes the push data.

In a possible implementation scenario, after obtaining the push data by decrypting the push message, the second push client may instruct an operating system of the terminal to process the push data. In another possible implementation scenario, the push message sent by the push server to the first push client may further include the push object identifier, and the push data forwarded by the first push client to the second push client also carries the push object identifier. In this way, the second push client can send the push data to a target application program indicated by the push object identifier or an REE application part corresponding to a target application program, so that the target application program or the REE application part corresponding to the target application program processes the push data.

Step S514: The first push client processes the push data.

In a possible implementation scenario, the first push client may instruct the TEE to call a trusted user interface (TUI, Trusted User Interface) to display the push data, or save the push data to trusted storage space. In another possible implementation scenario, the push message sent by the push server to the first push client may further include the push object identifier. In this way, the first push client can send the push data to a TEE application part corresponding to a target application program indicated by the push object identifier, so that the TEE application part corresponding to the target application program processes the push data.

According to the embodiments shown in FIG. 5a and FIG. 5b, push messages of different security levels are encrypted by using the TEE session key, and all are decrypted by a push client in the TEE. Push data is sent, based on a security level of the push data, to a corresponding push client for processing. This avoids information leakage in a process of processing, by the terminal in the REE, sensitive information of a relatively high security level, thereby resolving a push message security processing problem.

Figure 6A:
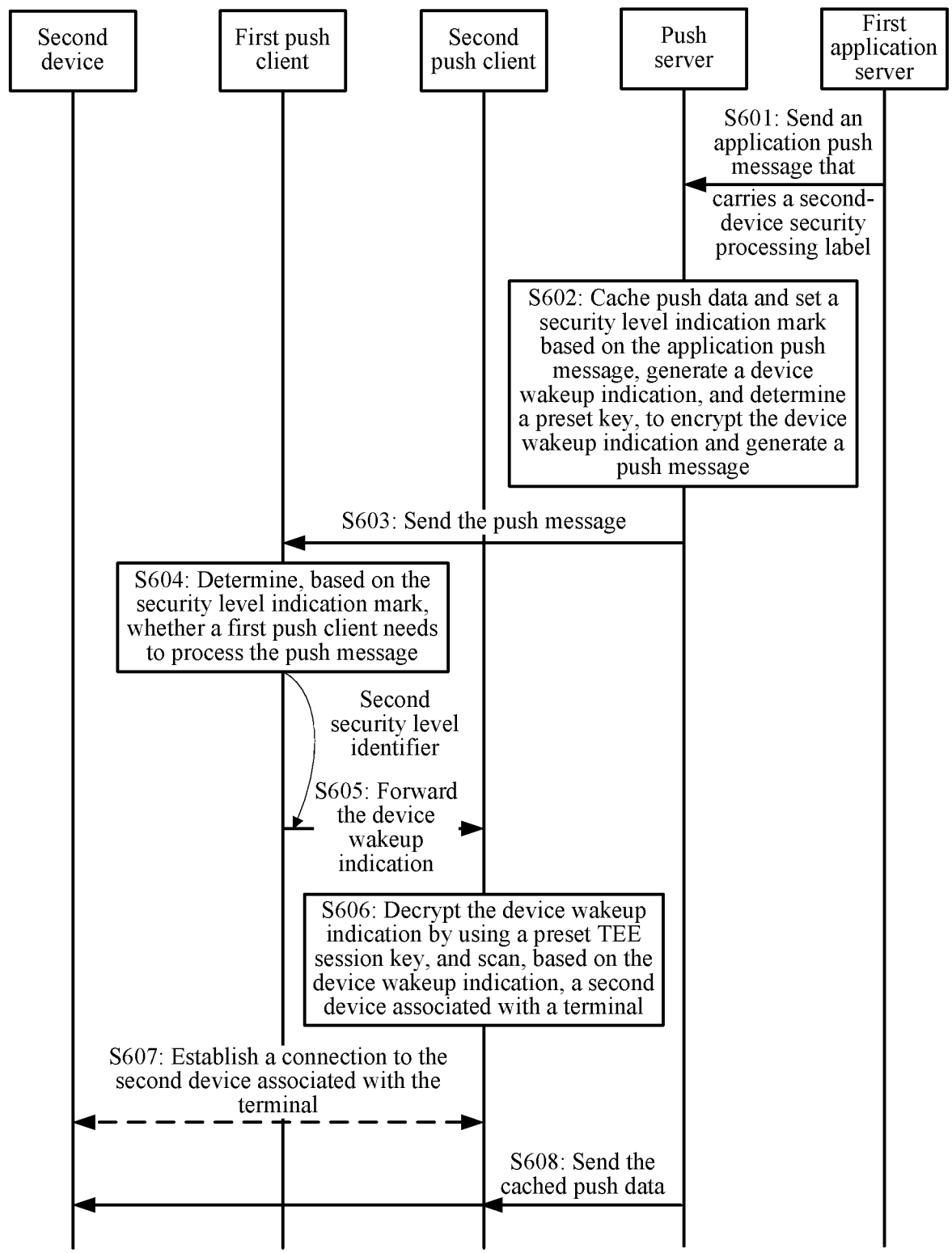
FIG. 6a is a schematic flowchart of a message push method based on a device associated with a terminal according to an embodiment of this application.
Figure 6B:
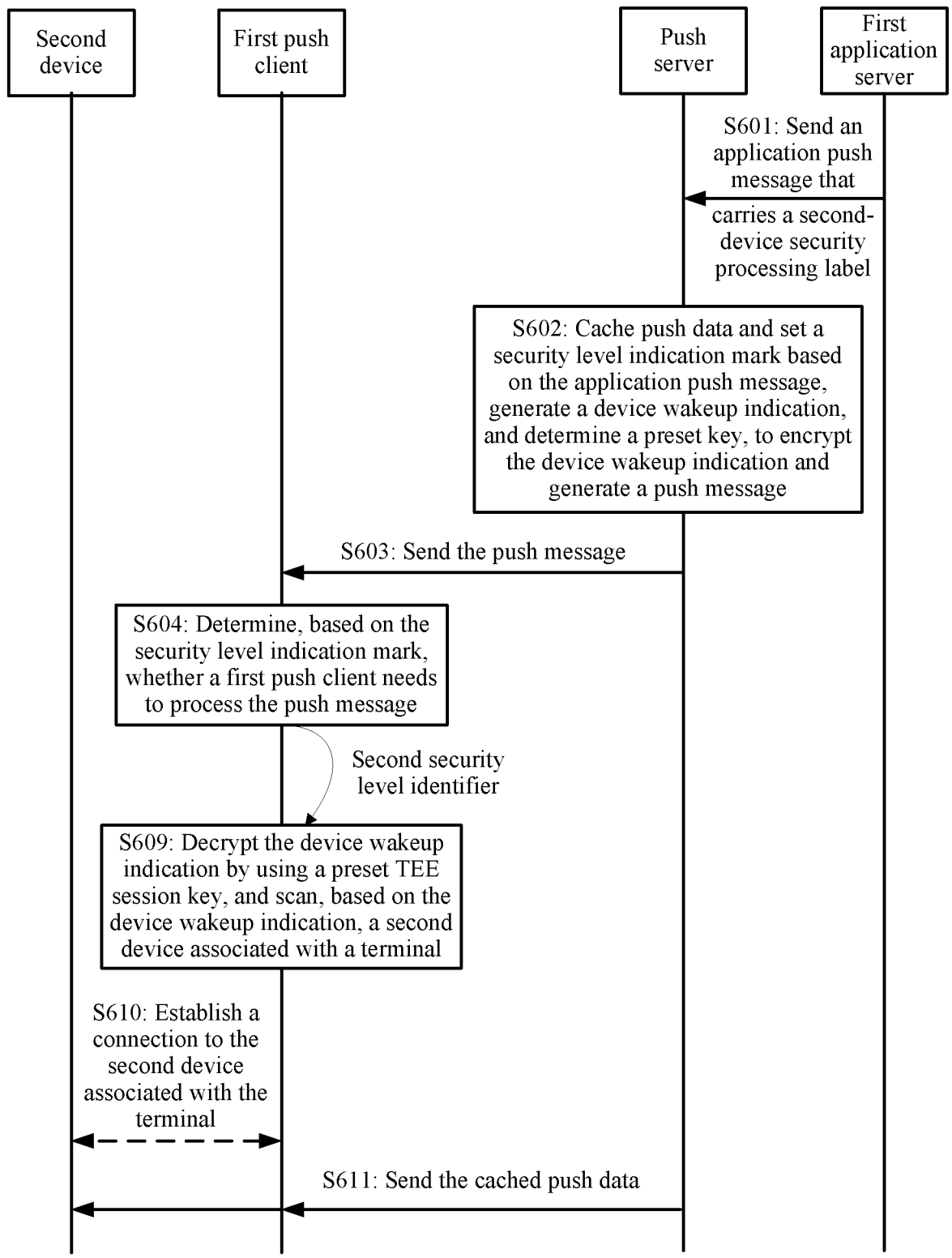
FIG. 6b is a schematic flowchart of another message push method based on a device associated with a terminal according to an embodiment of this application.

FIG. 6a and FIG. 6b are schematic flowcharts of two message push methods based on a device associated with a terminal according to embodiments of this application. In an embodiment shown in FIG. 6a, a first push client is a push client in an REE of a terminal, and a second push client is a push client in a TEE of the terminal. In an embodiment shown in FIG. 6b, a first push client is a push client in a TEE of a terminal, and a second push client is a push client in an REE of the terminal. A specific method includes the following steps.

Step S601: A first application server sends an application push message to a push client, where the application push message carries push data and a push object identifier.

The application push message carries the push data and the push object identifier. In other words, the first application server expects to send the push data to the terminal corresponding to the push object identifier. In the embodiments shown in FIG. 6a and FIG. 6b, the application push message may include a second-device security processing label. The second-device security processing label is used to indicate that the push data in the application push message is to be processed by a second device associated with the terminal. The push object identifier herein may include a terminal identifier and a second-device identifier.

Step S602: The push server caches the push data and sets a security level indication mark based on the application push message, generates a device wakeup indication, and determines a preset key, to encrypt the device wakeup indication and generate a push message.

In the embodiments shown in FIG. 6a and FIG. 6b, when receiving the push message including the second-device security processing label, the push server may first cache the push data, and set the security level indication mark to a second security level mark. The second security level mark may indicate push data for the second device associated with the terminal.

After setting the security level indication mark to the second security level mark, the push server may further generate the device wakeup indication, and encrypt the device wakeup indication by using a TEE session key that is generated in advance through negotiation. The device wakeup indication includes the identifier of the second device associated with the terminal, and may further include an action that the terminal is required to perform, for example, scanning the device by using a Bluetooth interface, and establishing a Bluetooth connection to the device.

In this way, the push server can generate the push message. In this embodiment, the push message includes the device wakeup indication and the second security level mark. The device wakeup indication included in the push message is encrypted by using the TEE session key.

Step S603: The push server sends the push message to the first push client.

In an implementation scenario shown in FIG. 6a, the first push client is the push client in the REE of the terminal, and the second push client is the push client in the TEE of the terminal. In the implementation scenario, the first push client may access a network communications interface to receive the push message sent by the push server, and the second push client cannot access the network communications interface and needs to receive the push message by using the first push client.

In an implementation scenario shown in FIG. 6b, the first push client is the push client in the TEE of the terminal. In the implementation scenario, the first push client has a capability of accessing a network communications interface, and can directly communicate with the push server.

Step S604: The first push client determines, based on the security level indication mark, whether the first push client needs to process the push message.

In the implementation scenario shown in FIG. 6a, step S604 may include step S6041.

Step S6041: If the security level indication mark is the second security level mark, the first push client does not need to process the push message, and steps S605 to S608 are performed.

In the implementation scenario shown in FIG. 6b, step S604 may include step S6042.

Step S6042: If the security level indication mark is the second security level mark, the first push client needs to process the push message, and steps S609 to S611 are performed.

Step S605: The first push client sends the device wakeup indication to the second push client.

The first push client does not need to process the push message, and therefore forwards the device wakeup indication to the second push client for processing. It should be noted that, in this case, the first push client may send only the device wakeup indication to the second push client, or may send the entire push message to the second push client. This is not specifically limited herein.

Step S606: The second push client decrypts the device wakeup indication by using the preset TEE session key, and scans, based on the device wakeup indication, the second device associated with the terminal.

The push server encrypts the device wakeup indication with the second security level mark by using the TEE session key. Therefore, the second push client only needs to decrypt the device wakeup indication by using the TEE session key that is generated in a key negotiation phase.

After obtaining the decrypted device wakeup indication, the second push client may scan, based on the device wakeup indication, the second device by calling a Bluetooth low energy global platform service (BLE GP Service, Bluetooth Low Energy Global Platform Service) interface. The second device herein may be a wearable device, an Internet of Things device, or the like.

Step S607: The second push client establishes a connection to the second device associated with the terminal, and informs the push server.

Step S608: The push server sends the cached push data to the second device by using the second push client.

The push data sent by the push server to the second push client may carry the push object identifier. In this way, the second push client can send the push data to a target application program that is indicated by the push object identifier and that is on the second device associated with the terminal, so that the target application program may process the push data.

Step S609: The first push client decrypts the device wakeup indication by using the preset TEE session key, and scans, based on the device wakeup indication, the second device associated with the terminal.

Step S610: The first push client establishes a connection to the second device associated with the terminal, and informs the push server.

Step S611: The push server sends the cached push data to the second device by using the first push client.

According to the embodiments shown in FIG. 6a and FIG. 6b, the push client in the TEE processes the device wakeup indication as push data of a relatively high level, so that the push client in the TEE can establish, based on the device wakeup indication, the connection to the second device associated with the terminal. This ensures that the push server sends the push data to the second device by using the push client in the TEE, and avoids information leakage in a process of processing, by the terminal, the related push data for the second device, thereby resolving a push message security processing problem.

Figure 7A:
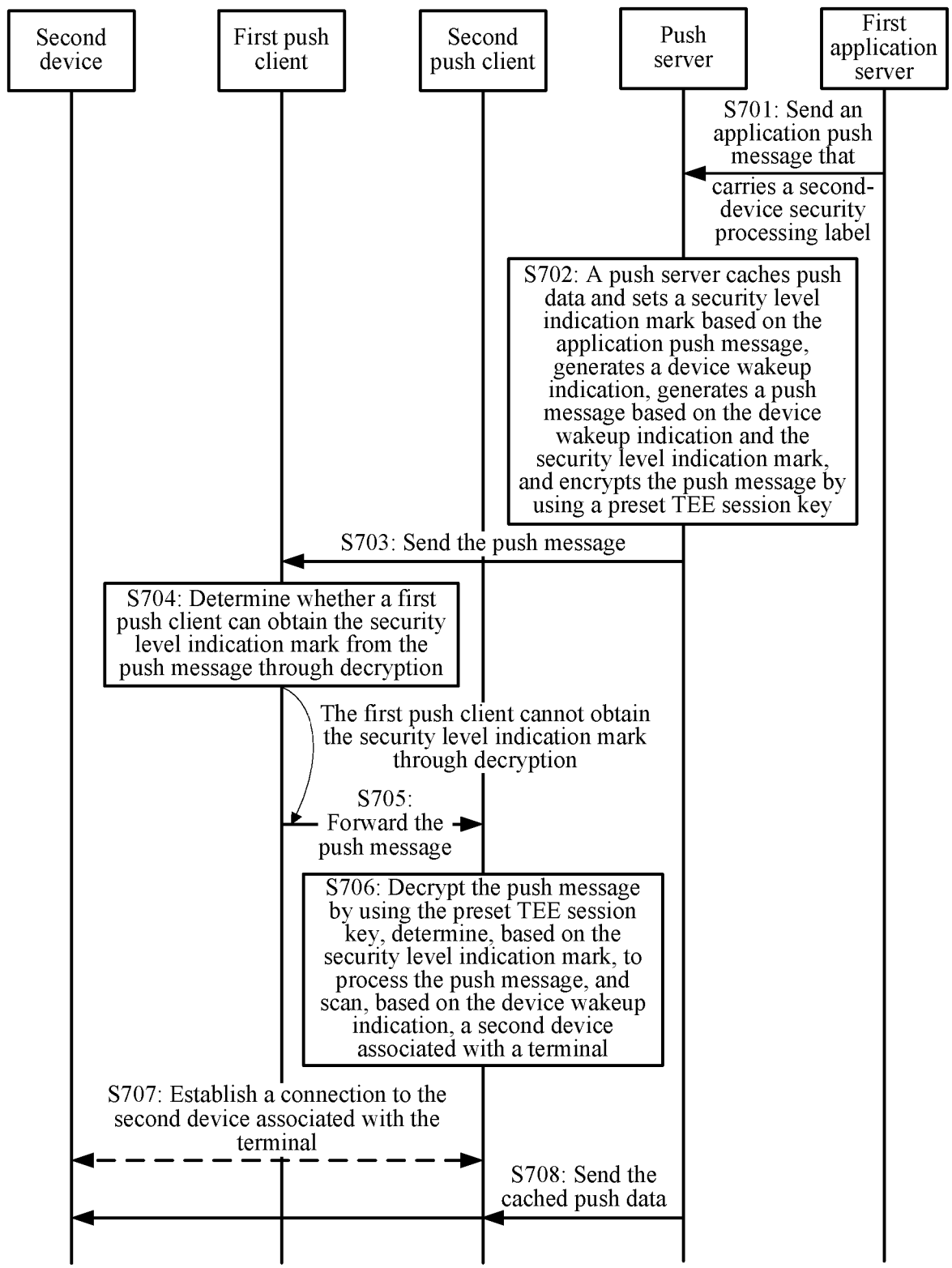
FIG. 7a is a schematic flowchart of another message push method based on a device associated with a terminal according to an embodiment of this application.
Figure 7B:
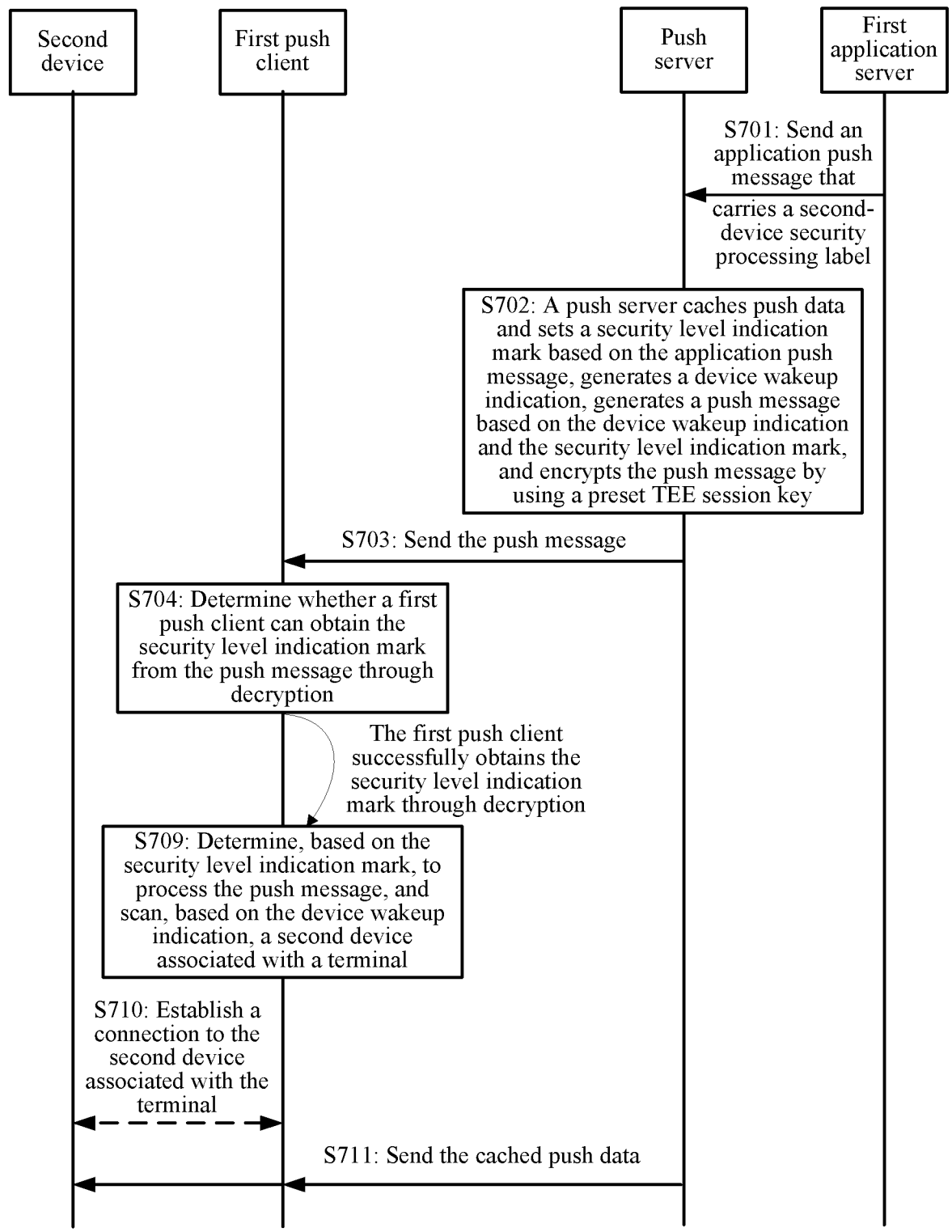
FIG. 7b is a schematic flowchart of another message push method based on a device associated with a terminal according to an embodiment of this application.

FIG. 7a and FIG. 7b are schematic flowcharts of two message push methods based on a device associated with a terminal according to embodiments of this application. In an embodiment shown in FIG. 7a, a first push client is a push client in an REE of a terminal, and a second push client is a push client in a TEE of the terminal. In an embodiment shown in FIG. 7b, a first push client is a push client in a TEE of a terminal, and a second push client is a push client in an REE of the terminal. A specific method includes the following steps.

Step S701: A first application server sends an application push message to a push client, where the application push message carries push data and a push object identifier.

Step S702: The push server caches the push data and sets a security level indication mark based on the application push message, generates a device wakeup indication, generates a push message based on the device wakeup indication and the security level indication mark, and encrypts the push message by using a preset TEE session key.

In the embodiments shown in FIG. 7a and FIG. 7b, when receiving the push message including a second-device security processing label, the push server may first cache the push data, and set the security level indication mark to a second security level mark. The second security level mark may indicate push data for a second device associated with the terminal.

After setting the security level indication mark to the second security level mark, the push server may further generate the device wakeup indication, and generate the push message by using the device wakeup indication and the security level indication mark. After generating the push message, the push server may encrypt the push message by using the TEE session key that is generated in advance through negotiation. In this way, the push message sent by the push server is encrypted, and the push message includes the device wakeup indication and the second security level mark. In the embodiments shown in FIG. 7a and FIG. 7b, the device wakeup indication is an unencrypted device wakeup indication.

Step S703: The push server sends the push message to the first push client.

Step S704: The first push client determines whether the first push client can obtain the security level indication mark from the push message through decryption.

In the implementation scenario shown in FIG. 7a, step S704 may include step S7041.

Step S7041: When the first push client cannot obtain the security level indication mark from the push message through decryption, the first push client does not need to process the push message, and steps S705 to S708 are performed.

When receiving the push message, the first push client needs to parse the push message to obtain the security level indication mark. When the first push client cannot obtain the security level indication mark in the push message through parsing, the first push client does not need to process the push message. In specific implementation, in a possible implementation scenario, the first push client stores no related key, and can directly determine, when receiving the push message, that the first push client cannot obtain the security level indication mark from the push message through decryption. In this case, the first push client does not need to process the push message, and steps S705 to S708 are performed. In another possible implementation scenario, the first push client possibly stores another key, and can perform decryption on the push message when receiving the push message. The push message sent by the push server is encrypted by using the TEE session key, but the first push client has no TEE session key, and cannot decrypt the encrypted push data. Therefore, the first push client cannot obtain the security level indication mark from the push message. In this case, the first push client does not need to process the push message, and steps S705 to S708 are performed.

In the implementation scenario shown in FIG. 7b, step S704 may include step S7042.

Step S7042: Perform steps S709 to S711 when the first push client successfully obtains the security level indication mark from the push message through decryption.

The push message sent by the push server is encrypted by using the TEE session key, and the first push client has the TEE session key. Therefore, the first push client can decrypt the push message. In this case, steps S709 to S711 are performed.

Step S705: The first push client forwards the push message to the second push client.

The first push client does not need to process the push message, and therefore forwards the push message to the second push client for processing.

Step S706: The second push client decrypts the push message by using the preset TEE session key, determines, based on the security level indication mark, to process the push message, and scans, based on the device wakeup indication, the second device associated with the terminal.

The push server encrypts the device wakeup indication with the second security level mark by using the TEE session key. Therefore, the second push client can obtain the device wakeup indication in the push message by decrypting the push message by using the TEE session key that is generated in a key negotiation phase.

After the device wakeup indication is obtained through decryption, because the second security level mark is detected, it is determined that the second push client processes the push message. The second push client may scan, based on the push object identifier, the second device by calling a Bluetooth low energy global platform service (BLE GP Service, Bluetooth Low Energy Global Platform Service) interface. The second device herein may be a wearable device, an Internet of Things device, or the like.

Step S707: The second push client establishes a connection to the second device associated with the terminal, and informs the push server.

Step S708: The push server sends the cached push data to the second device by using the second push client.

The push data sent by the push server to the second push client may carry the push object identifier. In this way, the second push client can send the push data to a target application program that is indicated by the push object identifier and that is on the second device associated with the terminal, so that the target application program may process the push data.

Step S709: The first push client determines, based on the security level indication mark, to process the push message, and scans, based on the device wakeup indication, the second device associated with the terminal.

Step S710: The first push client establishes a connection to the second device associated with the terminal, and informs the push server.

Step S711: The push server sends the cached push data to the second device by using the first push client.

According to the embodiments shown in FIG. 7a and FIG. 7b, the push client in the TEE processes the device wakeup indication as push data of a relatively high level, so that the push client in the TEE can establish, based on the device wakeup indication, the connection to the second device associated with the terminal. This ensures that the push server sends the push data to the second device by using the push client in the TEE, and avoids information leakage in a process of processing, by the terminal, the related push data for the second device, thereby resolving a push message security processing problem.

Figure 8A:
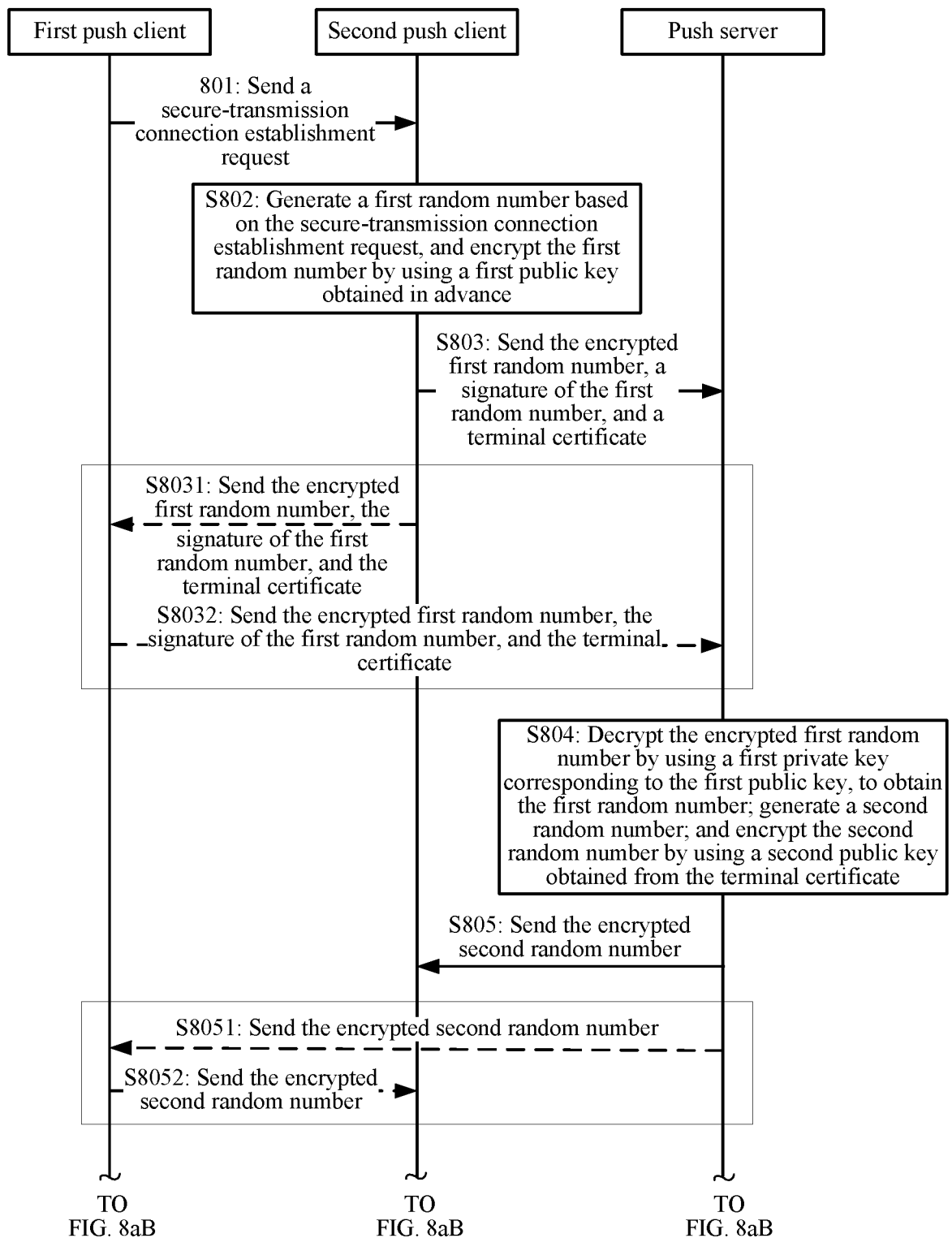
FIG. 8aA and FIG. 8aB are a schematic flowchart of a key negotiation method according to an embodiment of this application.
Figure 8A:
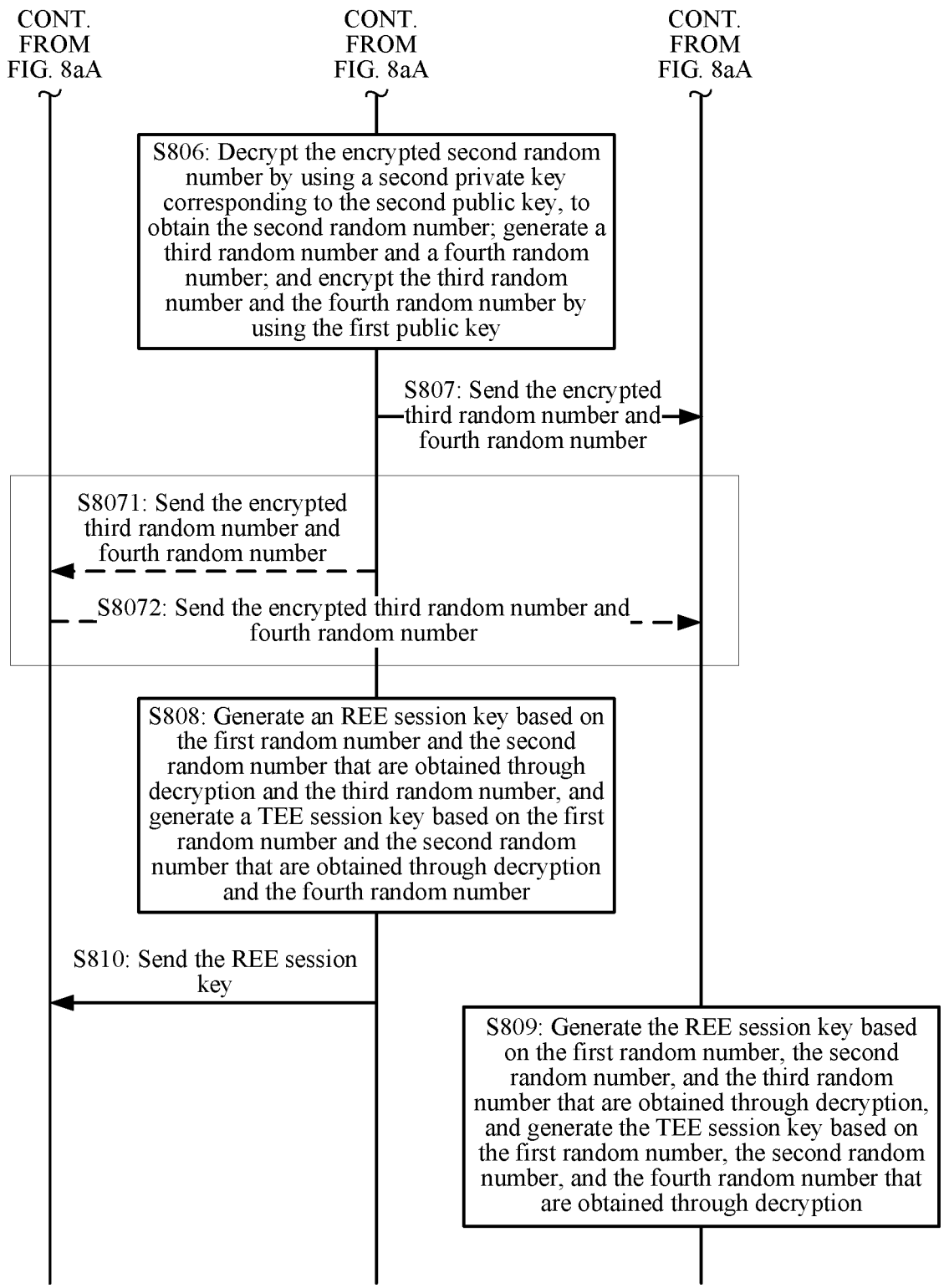
Figure 8B:
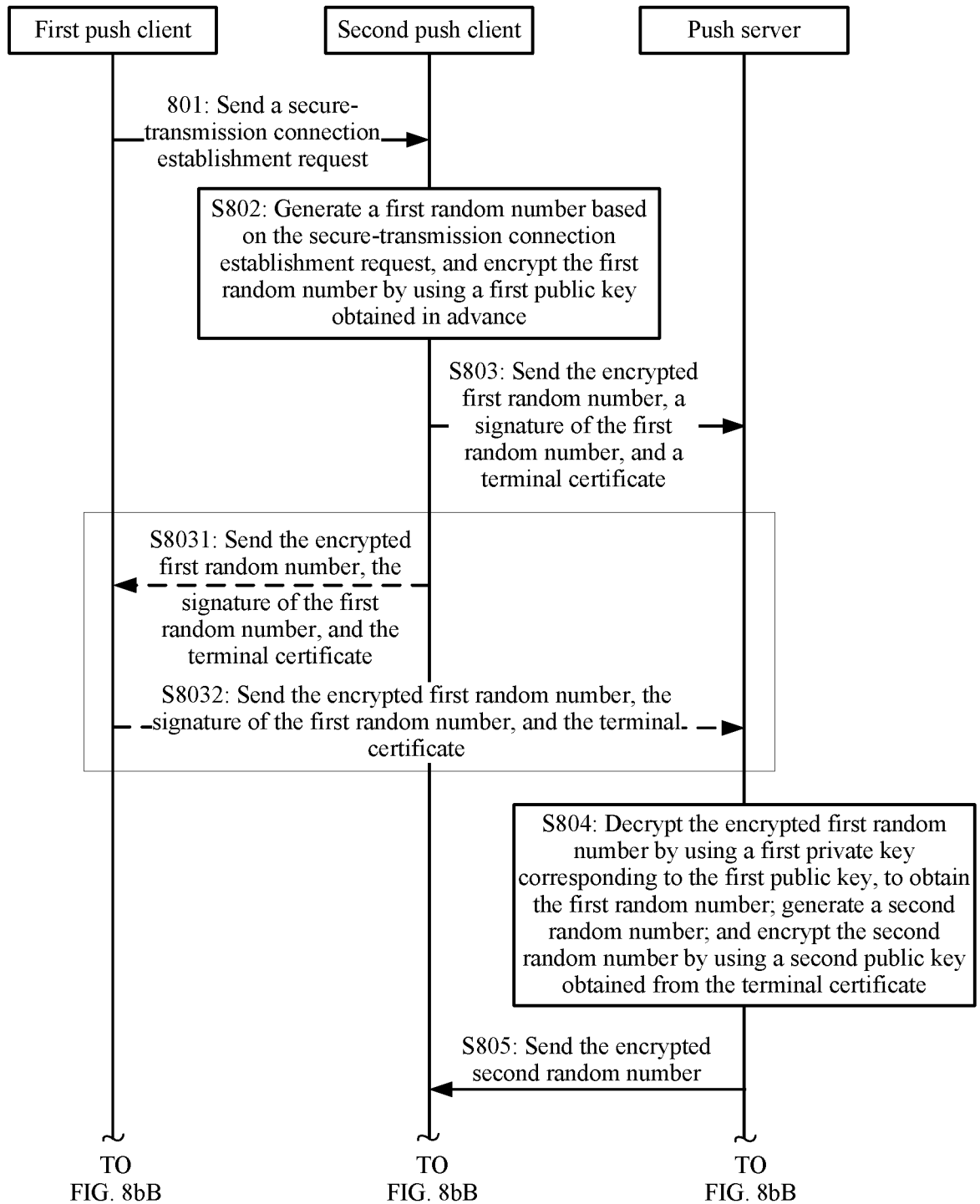
FIG. 8bA and FIG. 8bB are a schematic flowchart of another key negotiation method according to an embodiment of this application.
Figure 8B:
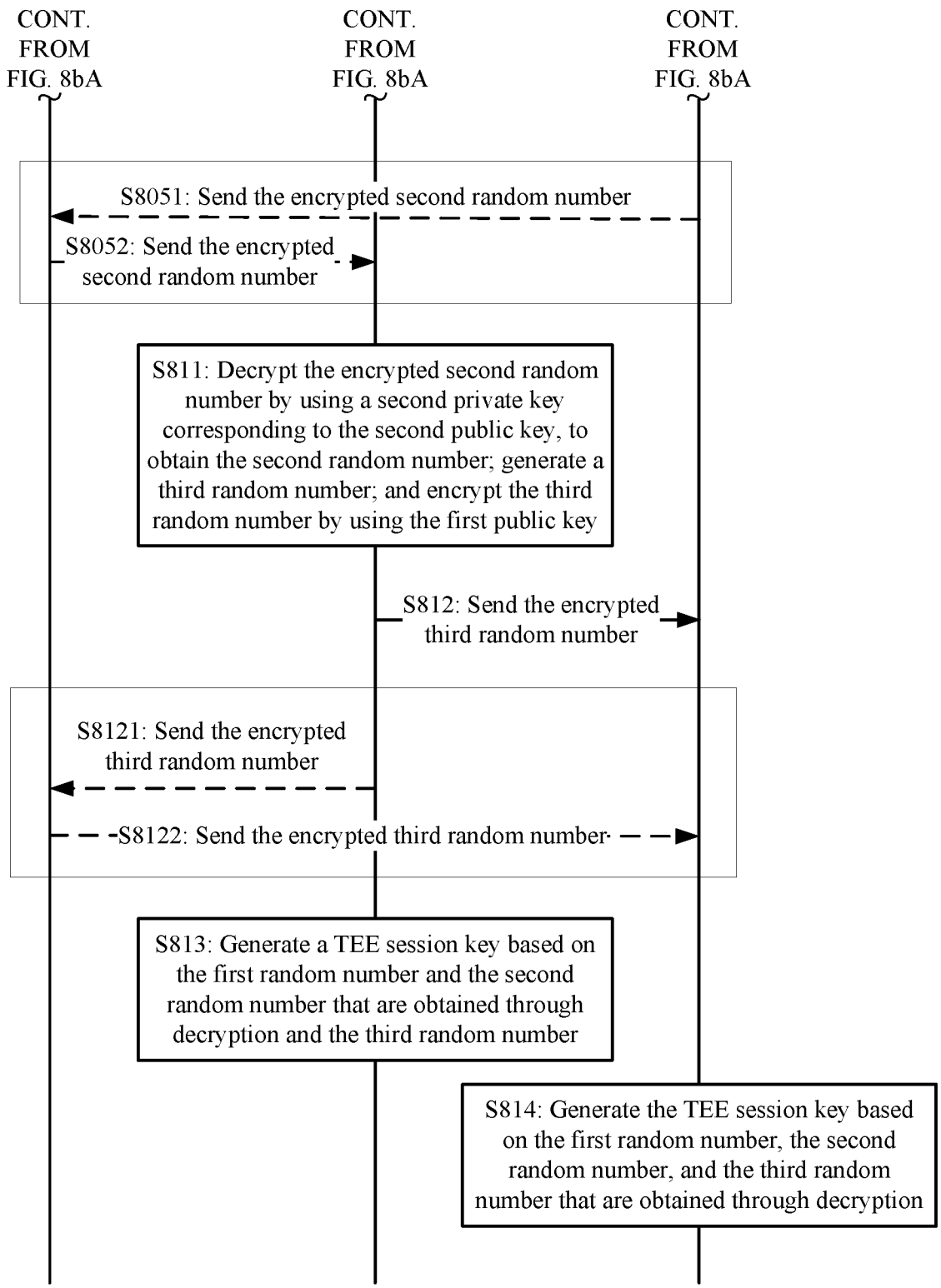

FIG. 8aA to FIG. 8bB describe in detail the key negotiation phase process mentioned in the embodiments in FIG. 4a to FIG. 7b, that is, a process of generating the TEE session key and/or the REE session key and saving the session key in the first push client and/or the second push client.

FIG. 8aA to FIG. 8bB are schematic flowcharts of two key negotiation methods according to embodiments of this application. When a push client exchanges push data with a push server, encryption needs to be performed to ensure push data transmission security. Therefore, before the push server sends a push message to the push client of a terminal, encryption key negotiation further needs to be performed. A key negotiation process in the embodiments of this application occurs after the terminal is started and in a process of establishing a connection between the push client and the push server. In the embodiments shown in FIG. 8aA to FIG. 8bB, a first push client is a push client in an REE of a terminal, and a second push client is a push client in a TEE of the terminal. A specific method includes the following steps.

Step S801: The first push client sends a secure-transmission connection establishment request to the second push client.

The push client of the terminal needs to establish a connection to the push server, to ensure that push data can be received at any time. The first push client may send the secure-transmission connection establishment request to the second push client. The secure-transmission connection establishment request indicates that the terminal requests to establish a Transport Layer Security protocol (TLS, Transport Layer Security) connection to the push server, to trigger a key negotiation process.

In a possible implementation scenario, the second push client can access a network communications interface, and can directly communicate with the push server. In this case, steps S802 to S810 or steps S802 to S805 and steps S811 to S814 are performed.

Step S802: The second push client generates a first random number based on the secure-transmission connection establishment request, and encrypts the first random number by using a first public key obtained in advance.

The second push client can generate the first random number after receiving the secure-transmission connection establishment request, and encrypt the first random number by using the first public key obtained in advance. It should be noted that the first public key is a public key carried in a certificate of the push server. Specifically, the second push client may obtain the certificate of the push server in advance, and extract the public key from the certificate, so as to encrypt the random number that is to be sent to the push server.

Step S803: The second push client sends the encrypted first random number, a signature of the first random number, and a terminal certificate to the push server.

After generating the encrypted first random number, the second push client may send the encrypted first random number, the signature of the first random number, and the certificate of the terminal itself together to the push server. The terminal certificate may be used by the push server to determine that the encrypted first random number is indeed sent by the terminal. Specifically, the push server may verify the signature of the first random number by using the terminal certificate, and if the signature is correct, may determine that the first random number is indeed sent by the terminal, and encrypt, by using a public key in the terminal certificate, a second random number generated by the push server.

Step S804: The push server decrypts the encrypted first random number by using a first private key corresponding to the first public key, to obtain the first random number, generates a second random number, and encrypts the second random number by using a second public key obtained from the terminal certificate.

It can be understood that, in an encryption manner in this embodiment of this application, the push server decrypts, by using a private key of the push server (the first private key), content that is encrypted by using a public key of the push server (the first public key), and the terminal decrypts, by using a private key corresponding to the terminal certificate (a second private key), content that is encrypted by using a public key in the terminal certificate (the second public key).

Therefore, the push server can obtain the first random number by decrypting the encrypted first random number by using the first private key corresponding to the first public key, further generate the second random number, and encrypt the second random number by using the second public key obtained from the terminal certificate.

Step S805: The push server sends the encrypted second random number to the second push client.

In an implementation scenario shown in FIG. 8aA and FIG. 8aB, two keys, namely, a TEE session key and an REE session key, are negotiated. In this case, steps S806 to S810 are performed. It can be understood that the TEE session key is stored by the second push client in trusted storage space of the TEE, and the REE session key is stored by the first push client in storage space of the REE.

Step S806: The second push client decrypts the encrypted second random number by using a second private key corresponding to the second public key, to obtain the second random number; generates a third random number and a fourth random number; and encrypts the third random number and the fourth random number by using the first public key.

The second push client can obtain the second random number by decrypting the encrypted second random number by using the second private key corresponding to the second public key, further generate the third random number and the fourth random number, and encrypt the third random number and the fourth random number by using the first public key.

Step S807: The second push client sends the encrypted third random number and fourth random number to the push server.

Step S808: The second push client generates the REE session key based on the first random number and the second random number that are obtained through decryption and the third random number that is locally generated, and generates the TEE session key based on the first random number and the second random number that are obtained through decryption and the fourth random number that is locally generated.

Based on a pre-agreed or specified encryption algorithm, the second push client generates the REE session key based on the first random number, the second random number, and the third random number, and generates the TEE session key based on the first random number, the second random number, and the fourth random number. The REE session key is a key stored and used by the first push client, and the TEE session key is a key stored and used by the second push client.

Step S809: The push server generates the REE session key based on the first random number, the second random number, and the third random number that are obtained through decryption, and generates the TEE session key based on the first random number, the second random number, and the fourth random number that are obtained through decryption.

Based on the pre-agreed or specified encryption algorithm, the push server generates the rich environment session key based on the first random number, the second random number, and the third random number, and generates the trusted environment session key based on the first random number, the second random number, and the fourth random number.

It should be noted that the encryption algorithms used in step S808 and step S809 are the same. Specifically, the second push client may send the agreed encryption algorithm to the push server in a key negotiation process or before a key negotiation process. Alternatively, the encryption algorithm between the second push client and the push server may be set in advance.

Step S810: The second push client sends the REE session key to the first push client.

The first push client saves the REE session key for subsequent use.

In an implementation scenario shown in FIG. 8bA and FIG. 8bB, one key, namely, a TEE session key, is negotiated. In this case, steps S811 to S814 are performed. The TEE session key is stored by the second push client in trusted storage space of the TEE.

Step S811: The second push client decrypts the encrypted second random number by using the second private key corresponding to the second public key, to obtain the second random number; generates a third random number; and encrypts the third random number by using the first public key.

Step S812: The second push client sends the encrypted third random number to the push server.

Step S813: The second push client generates the TEE session key based on the first random number and the second random number that are obtained through decryption and the third random number.

Step S814: The push server generates the TEE session key based on the first random number, the second random number, and the third random number that are obtained through decryption.

In another possible implementation scenario, the second push client cannot access a network communications interface, and cannot directly communicate with the push server. Therefore, forwarding needs to be performed by using the first push client. Therefore, step S803 may include the following:

Step S8031: The second push client sends the encrypted first random number, a signature of the first random number, and a terminal certificate to the first push client.

Step S8032: The first push client sends the encrypted first random number, the signature of the first random number, and the terminal certificate to the push server.

Step S805 may include the following:

Step S8051: The push server sends the encrypted second random number to the first push client.

Step S8052: The first push client sends the encrypted second random number to the second push client.

Step S807 may include the following:

Step S8071: The second push client sends the encrypted third random number and fourth random number to the first push client.

Step S8072: The first push client sends the encrypted third random number and fourth random number to the push server.

Step S812 may include the following:

Step S8121: The second push client sends the encrypted third random number to the first push client.

Step S8122: The first push client sends the encrypted third random number to the push server.

Figure 9:
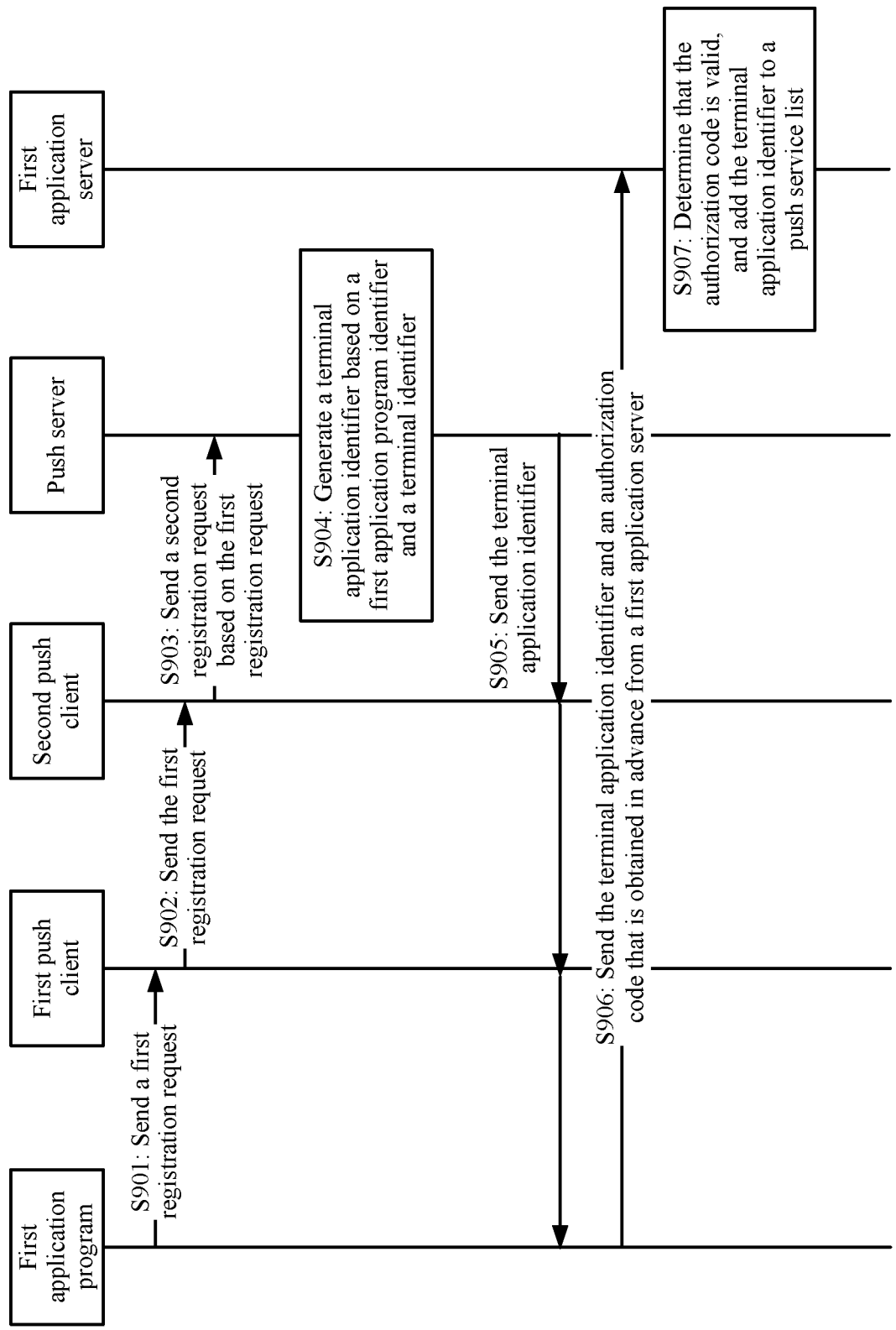
FIG. 9 is a schematic flowchart of a terminal application program registration method according to an embodiment of this application.

FIG. 9 is a schematic flowchart of a terminal application program registration method according to an embodiment of this application. Before an application server sends a push message to an application program of a terminal by using a push server, both the terminal and an application program running on the terminal need to register on the push server, so that the push server can subsequently send push data to the application program of the terminal. In the embodiment shown in FIG. 9, a first push client is a push client in an REE of a terminal, and a second push client is a push client in a TEE of the terminal. A specific method includes the following steps.

Step S901: A first application program of the terminal sends a first registration request to the first push client, where the first registration request includes a first application program identifier.

After the terminal completes installation of the first application program and a user successfully logs in to the first application program, the first application program may send the first registration request to the first push client. The first registration request includes the first application program identifier. The first application program identifier herein may refer to a name of the first application program, an application access interface, or the like. This is not specifically limited herein.

In a possible implementation scenario, the first registration request further includes a push message processing policy. The message processing policy may be used to indicate a processing method that the second push client should perform after subsequently obtaining push data. Specifically, the message processing policy may instruct the second push client to send the obtained push data to a trusted application part corresponding to the first application program, for displaying. The message processing policy may alternatively instruct the second push client to call a trusted user interface (TUI, Trusted User Interface) in the TEE, for displaying. The message processing policy may alternatively instruct the second push client to start a device, such as a wearable device, associated with the second push client.

Further, after the terminal completes installation of the first application program and the user successfully logs in to the first application program, an authorization code may be further obtained from a first application server corresponding to the first application program, for subsequent authentication.

Step S902: The first push client sends the first registration request to the second push client.

Step S903: The second push client sends a second registration request to a push server based on the first registration request, where the second registration request includes the first application program identifier and a terminal identifier.

After receiving the first registration request, the second push client may obtain the first application program identifier and further add the terminal identifier, to generate the second registration request. The terminal identifier may be a device identification code of the terminal or an REE identifier. In this embodiment of this application, the terminal identifier may also be a TEE identifier. In other words, the second push client may use, as the terminal identifier, both the identifier of the TEE in which the second push client is located and the obtained identifier of the REE in which the first push client is located, add the terminal identifier to the second registration request, and send the second registration request to the push server. In other words, push services for the two terminal execution environments are correspondingly registered on the push server.

Step S904: The push server generates a terminal application identifier based on the first application program identifier and the terminal identifier.

Based on the first application program identifier and the terminal identifier, the push server may associate the first application program identifier with the terminal identifier, to obtain one terminal application identifier related to both the first application program identifier and the terminal identifier. The terminal application identifier may represent the first application program, of the current terminal, sending the first registration request.

In a possible implementation scenario, before generating the terminal application identifier, the push server may first determine, based on the first application program identifier, whether the push server subscribes with the first application server corresponding to the first application program. The subscription herein may mean that the push server has permission to perform a push service for the first application server. If the push server has subscribed with the first application server, the push server generates the terminal application identifier.

Step S905: The push server sends the terminal application identifier to the first application program.

Step S906: The first application program sends, to the first application server corresponding to the first application program, the terminal application identifier and the authorization code that is obtained in advance from the first application server.

Step S907: The first application server determines that the authorization code is valid, and adds the terminal application identifier to a push service list.

After receiving the authorization code sent by the first application program, the first application server first performs verification on validity of the authorization code, and if verification succeeds, may add the received terminal application identifier to the push service list. All terminal application identifiers in the push service list represent terminals for which push services can be performed. When performing push, the first application server performs a push service for each terminal based on the terminal application identifiers in the push service list.

Further, the first application server may further associate the terminal application identifier with a specific user, that is, the user that successfully logs in to the first application program.

In this case, the first application program and the terminal on which the first application program is located complete registration, and the first application server and the push server may send a push message to the terminal on which the first application program is located.

Figure 10:
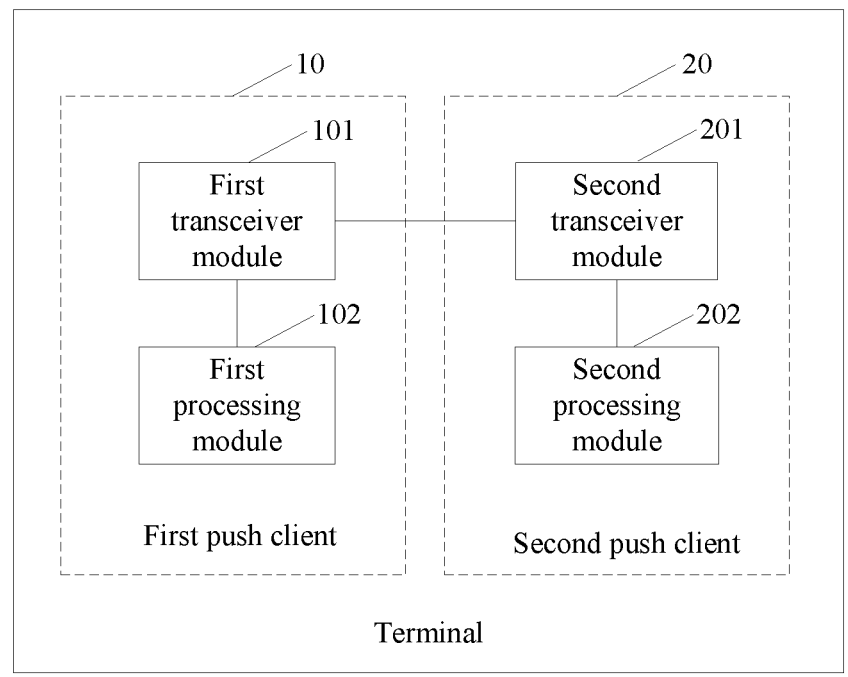
FIG. 10 is a schematic structural diagram of a terminal according to an embodiment of this application.

Referring to FIG. 10, FIG. 10 is a schematic structural diagram of a terminal according to an embodiment of this application. As shown in FIG. 10, the terminal includes a first push client 10 and a second push client 20. The first push client 10 includes a first transceiver module 101 and a first processing module 102, and the second push client 20 includes a second transceiver module 201 and a second processing module 202.

The first transceiver module 101 is configured to receive a push message sent by a push server, where the push message includes a security level indication mark and push data.

The first processing module 102 is configured to determine, based on the security level indication mark, whether the first processing module 102 needs to process the push message.

The first transceiver module 101 is further configured to: when it is determined that the first processing module 102 does not need to process the push message, forward the push data to the second transceiver module.

The second transceiver module 201 is configured to receive the push data.

The second processing module 202 is configured to process the push data.

The first push client is a push client in a first running environment of the terminal, and the second push client is a push client in a second running environment of the terminal.

Optionally, the security level indication mark includes a first security level mark or a second security level mark, the first security level mark is used to indicate that the push data is encrypted by using an REE session key, and the second security level mark is used to indicate that the push data is encrypted by using a Trusted Execution Environment TEE session key.

In a possible implementation scenario, the first running environment is an REE, the first push client 10 is a push client in the REE of the terminal, the second running environment is a TEE, and the second push client 20 is a push client in the TEE of the terminal.

The first processing module 102 is specifically configured to:

if the security level indication mark is the first security level mark, determine that the first processing module 102 needs to process the push message; or if the security level indication mark is the second security level mark, determine that the first processing module 102 does not need to process the push message.

Optionally, the second processing module 202 is specifically configured to:

decrypt the push data by using the TEE session key.

Optionally, the TEE session key is determined by the second processing module 202 and the push server through negotiation based on a random number generated by the second processing module and a random number generated by the push server.

In another possible implementation scenario, the first running environment is a TEE, the first push client 10 is a push client in the TEE of the terminal, the second running environment is an REE, and the second push client 20 is a push client in the REE of the terminal.

The first processing module 102 is specifically configured to:

if the security level indication mark is the first security level mark, determine that the first processing module 102 does not need to process the push message; or if the security level indication mark is the second security level mark, determine that the first processing module 102 needs to process the push message.

Optionally, the second processing module 202 is specifically configured to:

decrypt the push data by using the REE session key.

Optionally, the REE session key is sent to the second transceiver module 201 after being determined by the first processing module 102 and the push server through negotiation based on a random number generated by the first processing module 102 and a random number generated by the push server.

Optionally, the first processing module 102 is further configured to:

if determining that the first processing module 102 needs to process the push message, decrypt the push data by using the TEE session key, and call a trusted user interface TUI to display the decrypted push data, or save the decrypted push data to trusted storage space.

Optionally, the push message is generated after being encrypted by using a TEE session key.

In another possible implementation scenario, the first running environment is a TEE, the first push client 10 is a push client in the TEE of the terminal, the second running environment is an REE, and the second push client 20 is a push client in the REE of the terminal.

The first processing module 102 is further configured to:

decrypt the push message by using the TEE session key, to obtain the push data.

Optionally, the TEE session key is determined by the first processing module 102 and the push server through negotiation based on a random number generated by the first processing module 102 and a random number generated by the push server.

In another possible implementation scenario, the first running environment is an REE, the first push client 10 is a push client in the REE of the terminal, the second running environment is a TEE, and the second push client 20 is a push client in the TEE of the terminal.

The first processing module 102 is specifically configured to:

if the first processing module 102 is incapable of obtaining the security level indication mark from the push message through decryption, determine that the first processing module 102 does not need to process the push message.

Optionally, the second processing module 202 is specifically configured to:

decrypt the push message by using the TEE session key.

Optionally, the push data includes a device wakeup indication.

The first transceiver module 101 is specifically configured to:

forward the device wakeup indication to the second transceiver module 201.

The second processing module 202 is specifically configured to:

decrypt the device wakeup indication by using the TEE session key, and establish, based on the device wakeup indication, a connection to a second device corresponding to the device wakeup indication.

Optionally, the push data includes a device wakeup indication.

The first processing module 102 is further configured to:

if the first processing module 102 needs to process the push message, decrypt the device wakeup indication by using the TEE session key, and establish, based on the device wakeup indication, a connection to a second device corresponding to the device wakeup indication.

Optionally, the push message further includes a push object identifier.

The first transceiver module 101 is specifically configured to:

forward the push data and the push object identifier to the second transceiver module 201.

The second processing module 202 is further configured to:

send the push data to a target application program indicated by the push object identifier.

Optionally, the second processing module 202 is specifically configured to:

send the push data to the target application program that is indicated by the push object identifier and that is on the second device associated with the terminal.

According to the embodiment shown in FIG. 10, the terminal sends, based on a security level corresponding to the push message, the push data in the push message to the corresponding push client for processing. This avoids information leakage in a process of processing, by the terminal, sensitive information of a relatively high security level, thereby resolving a push message security processing problem.

Figure 11:
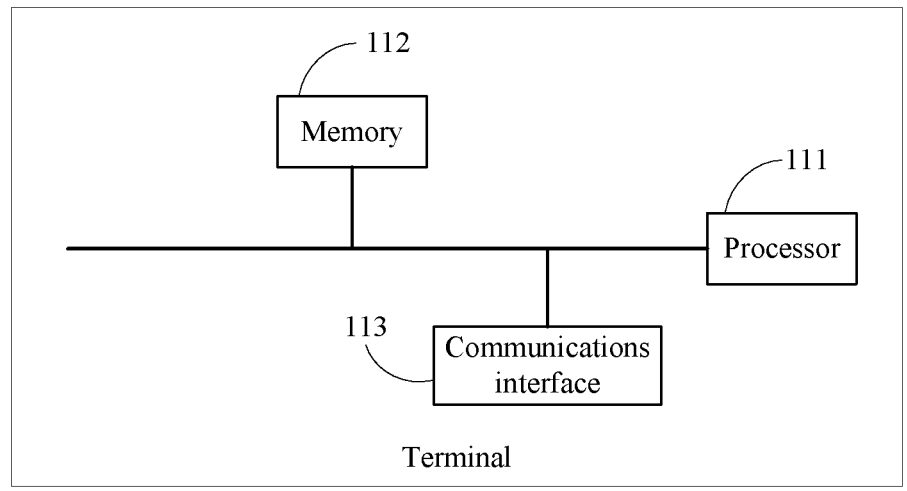
FIG. 11 is a schematic structural diagram of another terminal according to an embodiment of this application.

The terminal in the embodiment shown in FIG. 10 may be implemented as a terminal shown in FIG. 11. Referring to FIG. 11, FIG. 11 is a schematic structural diagram of another terminal according to an embodiment of the present invention. As shown in FIG. 11, the terminal includes a processor 111, a memory 112, and a communications interface 113. The processor 111 is connected to the memory 112 and the communications interface 113. For example, the processor 111 may be connected to the memory 112 and the communications interface 113 by using a bus.

In this embodiment of this application, the processor 111 is configured to implement functions of the first processing module 102 and the second processing module 202 that are shown in FIG. 10. The communications interface 113 is configured to implement functions of the first transceiver module 101 and the second transceiver module 201 that are shown in FIG. 10.

The processor 111 is configured as supporting the terminal in performing corresponding functions in the foregoing message push method. The processor 111 may be a central processing unit (English: central processing unit, CPU), a network processor (English: network processor, NP), a hardware chip, or any combination thereof. The hardware chip may be an application-specific integrated circuit (English: application-specific integrated circuit, ASIC), a programmable logic device (English: programmable logic device, PLD), or a combination thereof. The PLD may be a complex programmable logical device (English: complex programmable logic device, CPLD), a field-programmable logic gate array (English: field-programmable gate array, FPGA), a generic array logic (English: generic array logic, GAL), or any combination thereof.

The memory 112 is configured to store a push message, program code, and the like. The memory 112 may include a volatile memory (English: volatile memory), for example, a random access memory (English: random access memory, RAM for short). The memory 112 may alternatively include a non-volatile memory (English: non-volatile memory), for example, a read-only memory (English: read-only memory, ROM for short), a flash memory (English: flash memory), a hard disk (English: hard disk drive, HDD for short), or a solid state drive (English: solid state drive, SSD for short). The memory 112 may alternatively include a combination of the foregoing types of memories.

The communications interface 113 is configured to receive the message in the foregoing method from and send the message in the foregoing method to a device such as a push server.

A person of ordinary skill in the art may understand that all or some of the processes of the methods in the foregoing embodiments may be implemented by a computer program instructing relevant hardware. The program may be stored in a computer readable storage medium. When the program runs, the processes of the foregoing method embodiments may be included. The storage medium may be a magnetic disk, an optical disc, a read-only memory (Read-Only Memory, ROM), a random access memory (Random Access Memory, RAM), or the like.

The content disclosed above is merely examples of embodiments of the present invention, and definitely cannot be considered as a limitation on the scope of the claims of the present invention. Therefore, equivalent changes made according to the claims of the present invention still fall within the scope of the present invention.

What is claimed is:

1. A message push method, comprising:
receiving, by a first push client, a push message from a push server, the push message comprising a security level indication mark and push data;
determining, by the first push client based on the security level indication mark, whether the first push client needs to process the push message; and
forwarding, by the first push client, the push data to a second push client to process the push data when the first push client does not need to process the push message, the first push client being a push client in a first running environment of a terminal, the second push client being a push client in a second running environment of the terminal, the security level indication mark comprising a first security level mark or a second security level mark, the first security level mark indicating that the push data is encrypted using a Rich Execution Environment (REE) session key, and the second security level mark indicating that the push data is encrypted using a Trusted Execution Environment (TEE) session key.

2. The method of claim 1, wherein the first running environment is an REE, the first push client being a push client in the REE of the terminal, the second running environment being a TEE, the second push client being a push client in the TEE of the terminal, and determining whether the first push client needs to process the push message comprising:
   determining that the first push client needs to process the push message when the security level indication mark is the first security level mark; and
   determining that the first push client does not need to process the push message when the security level indication mark is the second security level mark.

3. The method of claim 2, wherein forwarding the push data to the second push client comprises forwarding, by the first push client, the push data to the second push client to enable the second push client to decrypt the push data using the TEE session key.

4. The method of claim 3, wherein the TEE session key is determined by the second push client and the push server through negotiation based on a random number generated by the second push client and a random number generated by the push server.

5. The method of claim 1, wherein the first running environment is a TEE, the first push client being a push client in the TEE of the terminal, the second running environment being an REE, the second push client being a push client in the REE of the terminal, and determining whether the first push client needs to process the push message comprising:
   determining that the first push client does not need to process the push message when the security level indication mark is the first security level mark; and
   determining that the first push client needs to process the push message when the security level indication mark is the second security level mark.

6. The method of claim 5, wherein forwarding the push data to the second push client comprises forwarding, by the first push client, the push data to the second push client to enable the second push client to decrypt the push data using the REE session key.

7. The method of claim 6, wherein the REE session key is determined by the first push client and the push server through negotiation based on a random number generated by the first push client and a random number generated by the push server and then sent to the second push client.

8. The method of claim 7, further comprising:
   decrypting, by the first push client, the push data using the TEE session key when the first push client determines that the first push client needs to process the push message; and
   calling, by the first push client, a trusted user interface (TUI) to display the decrypted push data, or store, by the first push client, the decrypted push data to trusted storage space.

9. The method of claim 2, wherein the push data comprises a device wakeup indication, and forwarding the push data to the second push client comprising forwarding, by the first push client, the device wakeup indication to the second push client to enable the second push client to decrypt the device wakeup indication using the TEE session key, and to establish, based on the device wakeup indication, a coupling to a second device corresponding to the device wakeup indication.

10. The method of claim 7, wherein the push data comprises a device wakeup indication, and when the first push client needs to process the push message, the method further comprising:
    decrypting, by the first push client, the device wakeup indication using the TEE session key; and
    establishing, by the first push client based on the device wakeup indication, a coupling to a second device corresponding to the device wakeup indication.

11. The method of claim 10, wherein the push message further comprises a push object identifier, forwarding the push data to the second push client comprising forwarding, by the first push client, the push data and the push object identifier to the second push client, and the push object identifier being used by the second push client to send the push data to a target application program indicated by the push object identifier.

12. The method of claim 11, wherein the push object identifier is used by the second push client to send the push data to the target application program indicated by the push object identifier on the second device associated with the terminal.

13. A terminal comprising:
    a memory storing instructions;
    a transceiver coupled to the memory and configured to receive, for a first push client, a push message from a push server, the push message comprising a security level indication mark and push data; and
    a processor coupled to the memory and the transceiver, the instructions causing the processor to be configured to:
       determine, based on the security level indication mark, whether the first push client needs to process the push message; and
       forward, using the transceiver, the push data to a second push client to process the push data when the first push client does not need to process the push message, the first push client being a push client in a first running environment of the terminal, and the second push client being a push client in a second running environment of the terminal, the security level indication mark comprising a first security level mark or a second security level mark, the first security level mark indicating that the push data is encrypted using a Rich Execution Environment (REE) session key, and the second security level mark indicating that the push data is encrypted using a Trusted Execution Environment (TEE) session key.

14. The terminal of claim 13, wherein the first running environment is an REE, the first push client being a push client in the REE of the terminal, the second running environment being a TEE, the second push client being a push client in the TEE of the terminal, and the instructions further causing the processor to be configured to:
    determine that the first push client needs to process the push message when the security level indication mark is the first security level mark; and
    determine that the first push client does not need to process the push message when the security level indication mark is the second security level mark.

15. The terminal of claim 14, wherein the instructions further cause the processor to be configured to forward, using the transceiver, the push data to the second push client to enable the second push client to decrypt the push data using the TEE session key.

16. The terminal of claim 15, wherein the TEE session key is determined by the second push client and the push server through negotiation based on a random number generated by the second push client and a random number generated by the push server.

17. The terminal of claim 13, wherein the first running environment is a TEE, the first push client being a push client in the TEE of the terminal, the second running environment being an REE, the second push client being a push client in the REE of the terminal, and the instructions further causing the processor to be configured to:
- determine that the first push client does not need to process the push message when the security level indication mark is the first security level mark; and
- determine that the first push client needs to process the push message when the security level indication mark is the second security level mark.

18. The terminal of claim 17, wherein the instructions further cause the processor to be configured to forward, using the transceiver, the push data to the second push client to enable the second push client to decrypt the push data using the REE session key.

19. The terminal of claim 18, wherein the REE session key is determined by the first push client and the push server through negotiation based on a random number generated by the first push client and a random number generated by the push server and then sent to the second push client.

20. The terminal of claim 18, wherein when the first push client needs to process the push message, the instructions further cause the processor to be configured to:
- decrypt the push data using the TEE session key; and
- call a trusted user interface (TUI) to display the decrypted push data, or store the decrypted push data to trusted storage space.

* * * * *